US012116065B2

(12) United States Patent
Niemela et al.

(10) Patent No.: US 12,116,065 B2
(45) Date of Patent: Oct. 15, 2024

(54) DEPLOYABLE STORAGE SYSTEM FOR VEHICLES

(71) Applicant: NB4 Brand L.L.C., Chassell, MI (US)

(72) Inventors: Marcus Niemela, Houghton, MI (US); Cal G. Niemela, Chassel, MI (US); Michael R. Jackson, Hancock, MI (US)

(73) Assignee: The Kingstar Company, Chassell, MI (US)

( * ) Notice: Subject to any disclaimer, the term of this patent is extended or adjusted under 35 U.S.C. 154(b) by 0 days.

(21) Appl. No.: 18/361,500

(22) Filed: Jul. 28, 2023

(65) Prior Publication Data

US 2023/0373579 A1 Nov. 23, 2023

Related U.S. Application Data

(62) Division of application No. 16/849,376, filed on Apr. 15, 2020, now Pat. No. 11,713,089.

(60) Provisional application No. 62/915,969, filed on Oct. 16, 2019, provisional application No. 62/834,443, filed on Apr. 16, 2019.

(51) Int. Cl.
*B60P 1/44* (2006.01)
*A01K 1/00* (2006.01)
*A01K 5/02* (2006.01)
*B62D 63/08* (2006.01)

(52) U.S. Cl.
CPC ............ *B62D 63/08* (2013.01); *A01K 1/0035* (2013.01); *A01K 5/02* (2013.01)

(58) Field of Classification Search
CPC ......... B60R 9/042; B60P 1/022; B60P 1/4414
See application file for complete search history.

(56) References Cited

U.S. PATENT DOCUMENTS

| 238,243 A | 3/1881 | Mitchell |
| 3,019,763 A | 2/1962 | Ferris |
(Continued)

FOREIGN PATENT DOCUMENTS

WO WO-2018134312 A1 * 7/2018 ............ B60P 1/6418

OTHER PUBLICATIONS

Brochure entitled "TNC Travel N Corrals, Lightweight Portable Corrals", published on or before Jul. 6, 2016.
(Continued)

*Primary Examiner* — Jonathan Snelting
(74) *Attorney, Agent, or Firm* — Gardner, Linn, Burkhart & Ondersma LLP

(57) ABSTRACT

A deployable hay pod elevator system for a transport vehicle, such as a livestock trailer, provides a readily deployable hay pod, storage pod, or supply platform with the trailer, and is readily stowable above the trailer in a raised configuration for travel. The elevator system includes a deployable supply platform and a lift system configured to raise and lower the supply platform relative to the trailer. The lift system may include a screw drive system or a winch and cable system to vertically raise and lower the deployable supply platform. The lift system may pivot or rotate the hay pod over the top of the trailer for transportation purposes. The deployable hay pod elevator system can be fitted to a truck, a van, or other types of vehicles and can be configured to store and transport various materials, such as hay, tools, or livestock tack.

18 Claims, 27 Drawing Sheets

(56) References Cited

U.S. PATENT DOCUMENTS

| | | | |
|---|---|---|---|
| 3,387,825 A | 6/1968 | Kreeger | |
| 3,574,388 A | 4/1971 | Stone | |
| 3,726,256 A | 4/1973 | Bernhardt et al. | |
| 3,741,529 A | 6/1973 | Blagg | |
| 3,828,733 A | 8/1974 | Correia | |
| 3,943,890 A | 3/1976 | Calia | |
| 3,970,045 A | 7/1976 | Graham, Jr. | |
| 4,052,098 A | 10/1977 | Metz | |
| 4,090,472 A | 5/1978 | York | |
| 4,153,011 A | 5/1979 | Weissman et al. | |
| 4,168,933 A | 9/1979 | Kane | |
| 4,250,836 A | 2/1981 | Smith | |
| 4,329,100 A | 5/1982 | Golze | |
| 4,355,594 A | 10/1982 | Wagner | |
| 4,468,046 A | 8/1984 | Rutherford | |
| 4,494,733 A | 1/1985 | Olsson | |
| 4,537,151 A | 8/1985 | Bolton | |
| 4,659,136 A | 4/1987 | Martin et al. | |
| 4,733,899 A | 3/1988 | Keys | |
| 4,958,594 A | 9/1990 | Swagerty | |
| 4,964,768 A | 10/1990 | Shomo | |
| RE33,959 E | 6/1992 | Mollhagen | |
| 5,235,468 A | 8/1993 | Stephens | |
| 5,240,301 A | 8/1993 | Arnold | |
| 5,303,947 A | 4/1994 | Gerber | |
| 5,346,355 A | 9/1994 | Riemer | |
| 5,361,929 A | 11/1994 | Mclain et al. | |
| 5,423,650 A | 6/1995 | Zerbst et al. | |
| 5,427,486 A | 6/1995 | Green | |
| 5,490,705 A | 2/1996 | Barr | |
| 5,513,595 A | 5/1996 | Chatterton | |
| 5,688,087 A | 11/1997 | Stapleton et al. | |
| 5,715,641 A | 2/1998 | Hall, Jr. | |
| 5,738,037 A | 4/1998 | Mahan | |
| 5,738,341 A | 4/1998 | Lease | |
| 5,810,412 A | 9/1998 | Hall | |
| 5,887,928 A | 3/1999 | Fenske | |
| 5,924,385 A | 7/1999 | Cossel | |
| 6,029,873 A | 2/2000 | Won et al. | |
| 6,067,940 A | 5/2000 | Holder | |
| 6,077,007 A | 6/2000 | Porter et al. | |
| 6,206,624 B1 | 3/2001 | Brandenburg | |
| 6,257,558 B1 | 7/2001 | Levine et al. | |
| 6,283,537 B1 | 9/2001 | Devore, III | |
| 6,467,433 B1 | 10/2002 | Stanton et al. | |
| 6,477,985 B1 | 11/2002 | Mennenga et al. | |
| 6,499,435 B2 | 12/2002 | Markham | |
| 6,557,329 B2 | 5/2003 | Schmidt | |
| 6,571,744 B1 | 6/2003 | Olson et al. | |
| 6,595,496 B1 | 7/2003 | Langlie et al. | |
| 6,622,436 B1 | 9/2003 | Kretsch | |
| 6,662,751 B1 | 12/2003 | Rutter | |
| 6,729,267 B2 | 5/2004 | Campbell | |
| 6,755,155 B2 | 6/2004 | May | |
| 6,863,029 B1 | 3/2005 | Neufelder | |
| 6,866,252 B2 | 3/2005 | Pulliam | |
| 6,895,897 B1 | 5/2005 | Culp et al. | |
| 7,004,525 B1 | 2/2006 | Turnbow | |
| 7,325,513 B1 | 2/2008 | Velasquez | |
| 7,350,480 B1 | 4/2008 | Hughes | |
| 7,393,042 B2 | 7/2008 | Alfstad-Seibel et al. | |
| 7,637,060 B2 | 12/2009 | Starheim et al. | |
| 7,685,970 B1 | 3/2010 | Rains | |
| 8,113,760 B1 | 2/2012 | Schroll | |
| 8,171,889 B2 | 5/2012 | Lindfors et al. | |
| 8,281,969 B2 | 10/2012 | Schmidlkofer | |
| 8,322,580 B1* | 12/2012 | Hamilton | B60R 9/055 224/310 |
| 8,322,966 B2 | 12/2012 | Doskocil | |
| 8,870,243 B2 | 10/2014 | Elkington et al. | |
| 9,132,762 B1 | 9/2015 | Heath | |
| 9,914,400 B1* | 3/2018 | Johnsrud | B60R 9/058 |
| 10,206,369 B2 | 2/2019 | Niemela et al. | |
| 10,405,516 B2 | 9/2019 | Niemela et al. | |
| 11,225,184 B2* | 1/2022 | Renger | B60P 3/2245 |
| 11,638,411 B2 | 5/2023 | Niemela et al. | |
| 11,713,089 B2 | 8/2023 | Niemela et al. | |
| 2003/0209206 A1 | 11/2003 | Campbell | |
| 2003/0209208 A1 | 11/2003 | Campbell et al. | |
| 2006/0133914 A1* | 6/2006 | Derks | B60R 9/055 414/462 |
| 2017/0215373 A1 | 8/2017 | Ruetenik | |

OTHER PUBLICATIONS

Website excerpts of Cimarron Trailer at cimarrontrailers.com/trailer-models/custom-options/concealed-hay-lift/, and screenshots of a video available at https://www.youtube.com/watch?v=LWuvMvThQhE, published on or before Dec. 2, 2014.

* cited by examiner

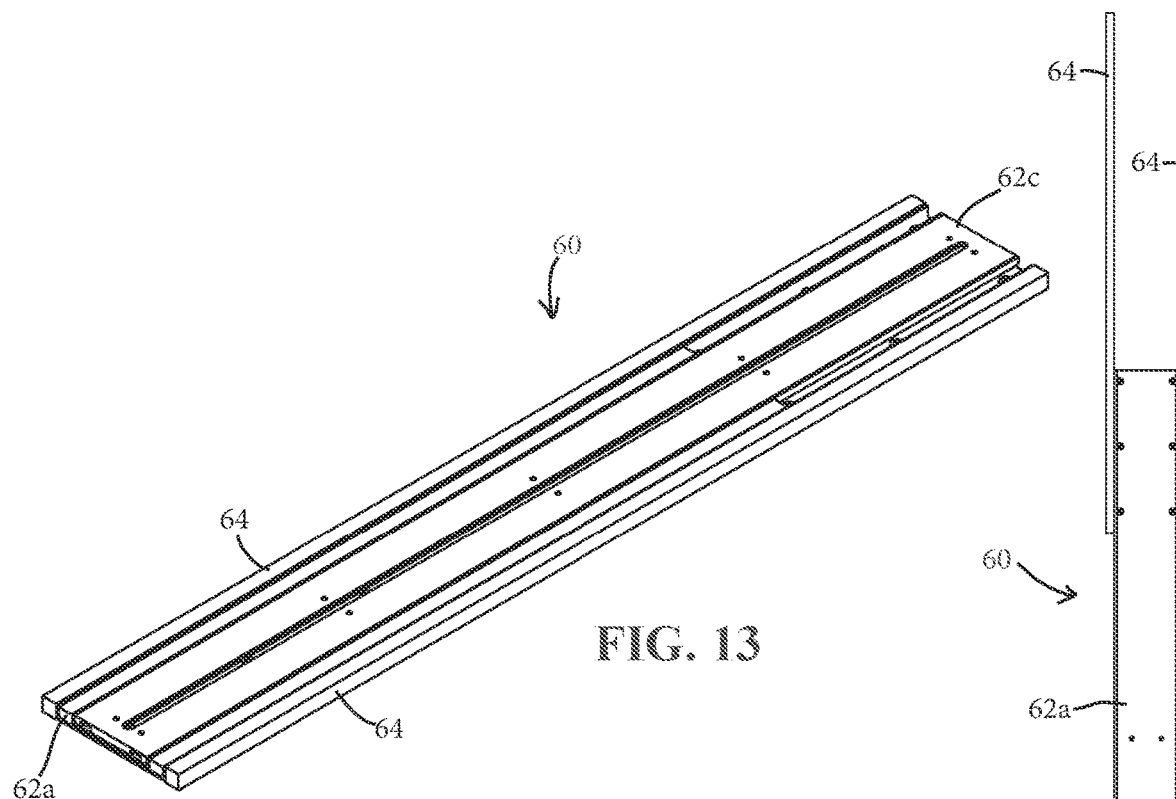
FIG. 13
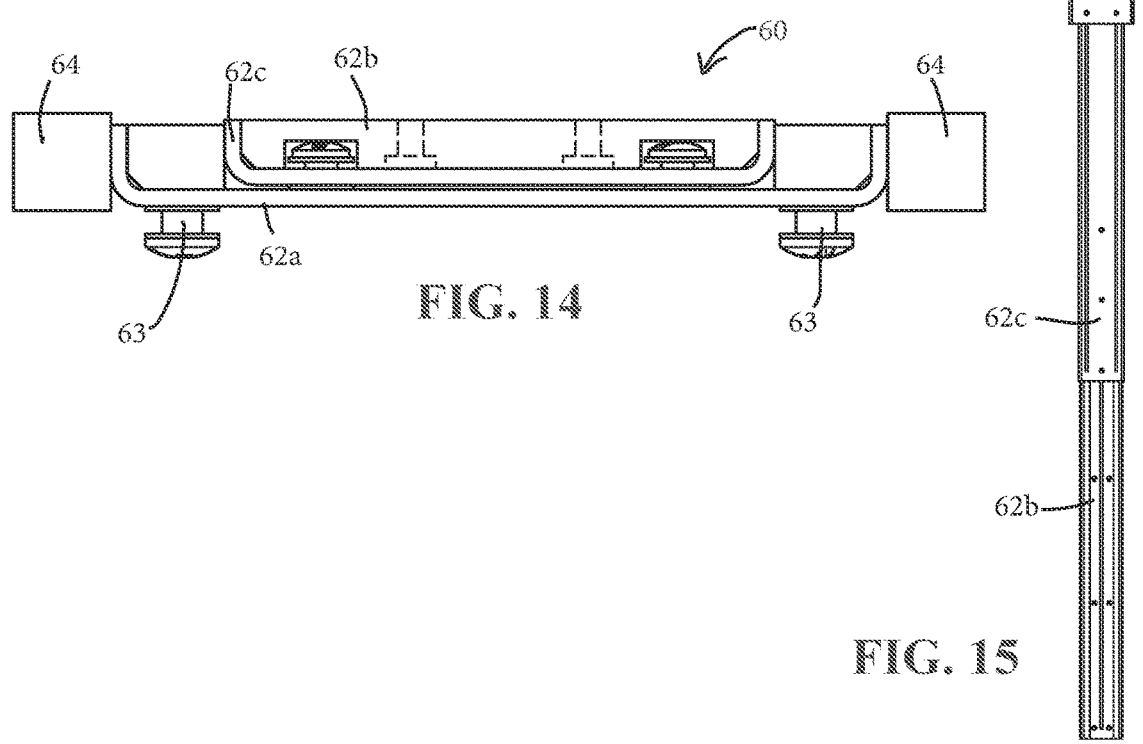
FIG. 14
FIG. 15

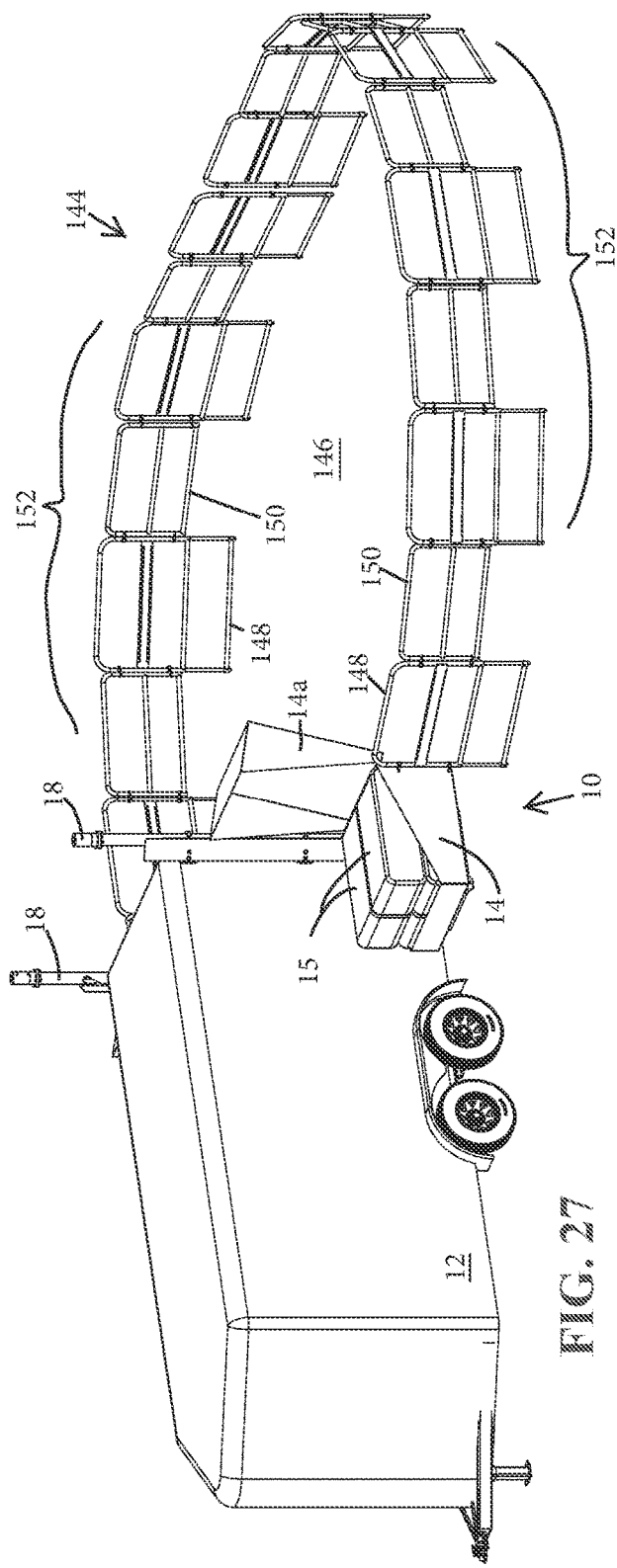
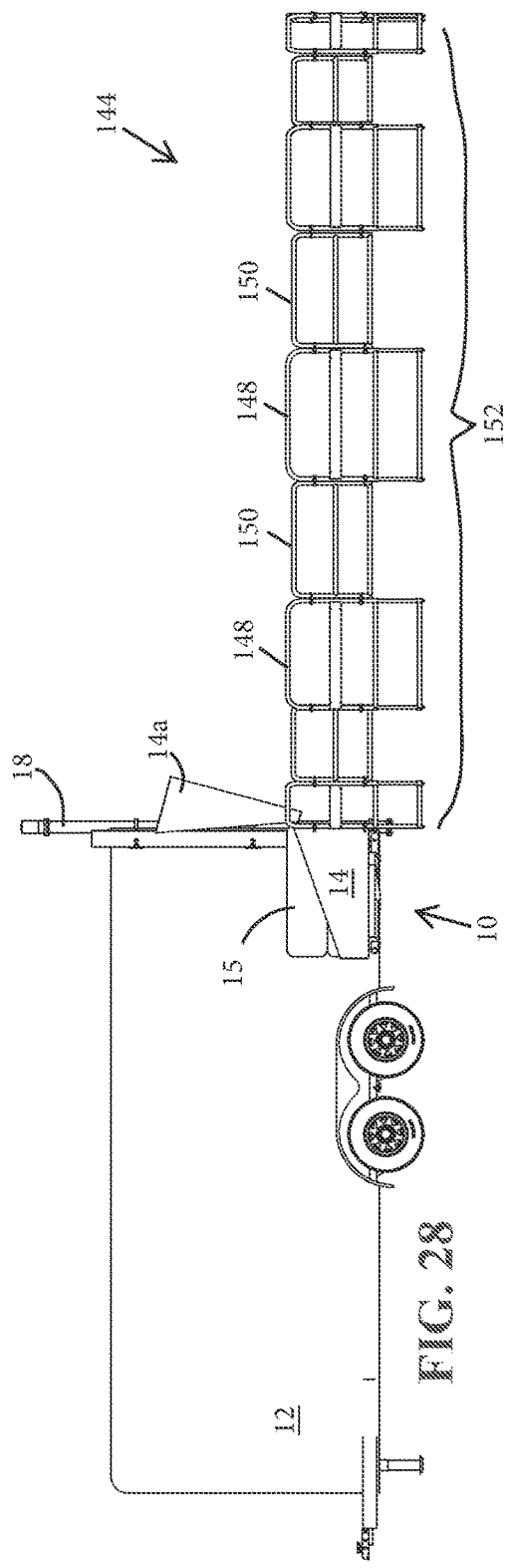

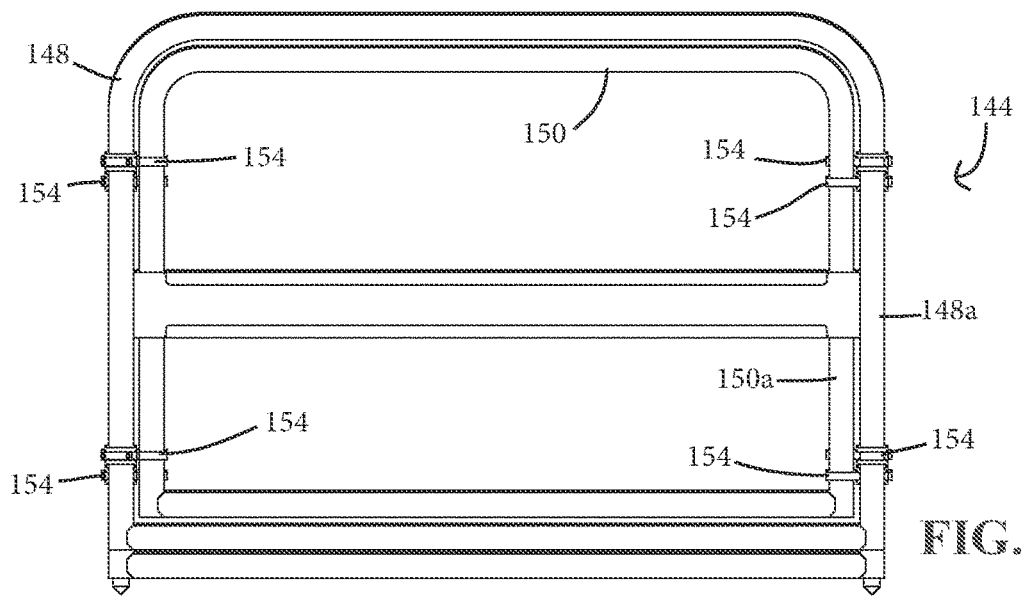
FIG. 30
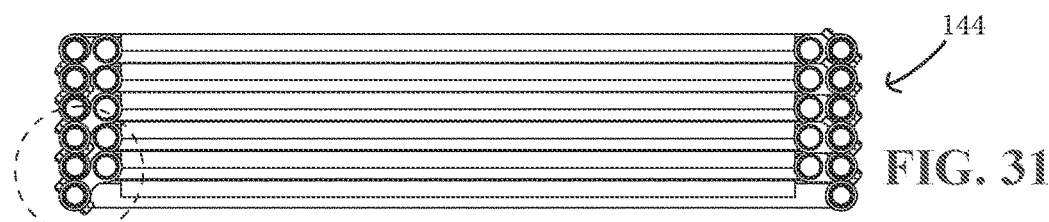
FIG. 31
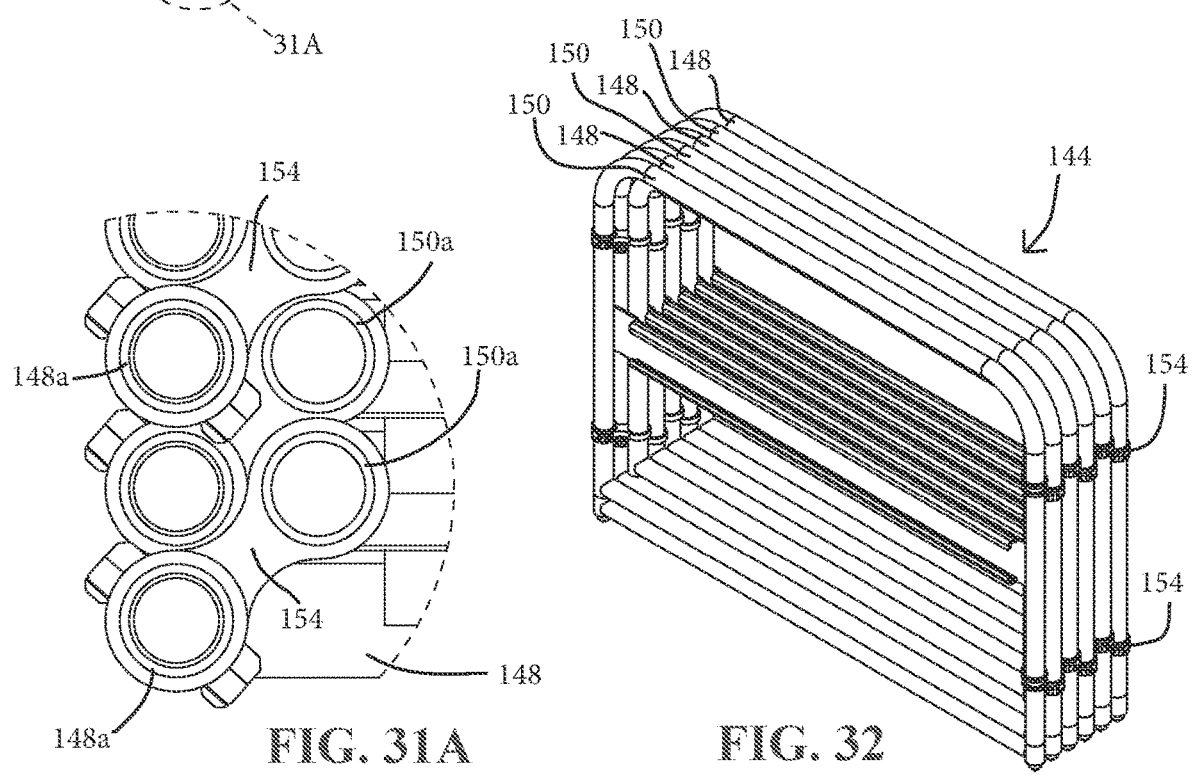
FIG. 31A
FIG. 32

DEPLOYABLE STORAGE SYSTEM FOR VEHICLES

CROSS REFERENCE TO RELATED APPLICATIONS

The present application is a divisional of U.S. patent application Ser. No. 16/849,376, filed Apr. 15, 2020, now U.S. Pat. No. 11,713,089, issued Aug. 1, 2023, which claims priority of U.S. provisional applications, Ser. No. 62/834,443, filed Apr. 16, 2019, and Ser. No. 62/915,969, filed Oct. 16, 2019, all of which are hereby incorporated herein by reference in their entireties.

FIELD OF THE INVENTION

The present invention relates to storage systems for recreational vehicles, work vehicles, trailers, and the like.

BACKGROUND OF THE INVENTION

Those who move livestock, goods, or materials over-the-road from one location to another, for reason of work, hobby or show, or recreation, typically do so using towable trailers specially designed for this purpose. Some trailers, such as horse trailers, have provisions to accommodate one or more animals in a main compartment, and provide storage areas for other goods such as feed (e.g., hay) as well as saddles, bridles, blankets, and other horse-related equipment known generally as "tack". In addition, when horses are being transported over longer distances and for a period of several days, hay, water, and bedding (e.g., wood shavings) are also carried in or on the trailer or the tow vehicle. Some known horse trailers have a designated roof top area where several bales of hay can be stored. However, various other types of vehicles such as work vehicles (trucks, vans, etc.), recreational vehicles (including self-powered camper RV's, boats, camping trailers and toy haulers), often include storage bins for various goods, which bins may be accessible from outside the vehicles.

SUMMARY OF THE INVENTION

The present invention provides, in its various forms, a transport trailer with an integrated and deployable storage elevator for lifting and stowing supplies or feed, such as tack or hay. The integrated storage elevator can be deployed and retracted manually or automatically by means of an onboard motor such as an electrical power system or the like, which may be powered by a rechargeable battery, a combustion engine, or a tow vehicle electrical or pneumatic or hydraulic system, for example. The storage elevator includes a deployable supply handling platform or storage bin that can be raised to an out-of-the-way storage location atop the trailer to which it is mounted, and the storage bin can be lowered or deployed to at least one side or to a front or rear of the trailer, where it can be conveniently accessed for loading, unloading, or storage while the trailer is parked. The storage elevator includes a raising and lowering element, such as a lift hoist, to vertically raise and lower the storage bin along a vertical travel path that is parallel to an upright wall of the trailer. In one aspect, the raising and lowering element includes a motor to raise and lower the storage bin. Optionally, the deployable storage elevator provides simplified push-button deployment and retraction, with heavy lifting and stowing of the storage bin handled by a deployment mechanism. The deployable storage elevator system provides a readily deployable storage bin along with the trailer. The system may be integrated into the trailer to provide one or more self-deploying and self-stowing storage bins, such as for overnight or short term use during travel with horses or other livestock, during camping activities, or the like. The elevator system may pivot or rotate the storage bin to a stowed location atop the trailer.

In one form of the present invention, the deployable storage elevator includes a screw drive disposed inside of a support tube. The support tube includes a keyway to guide the storage bin along said screw drive during stowing and deploying of the support bin. The screw drive rotates and threadedly engages with a lift element, such as a support arm or a bearing block, which translates vertically within the support tube in response to rotation of the screw drive. The lift element is coupled to the storage bin so that the storage bin is raised and lowered with the lift element in response to the screw drive. As the screw drive rotates, the lift element climbs up or down the screw drive depending on the direction of rotation of the screw drive. Optionally, as the storage bin approaches the top of the support tube, a twisting or pivoting feature or mechanism pivots the storage bin around the rotational axis of the screw drive and over the top of the trailer where it is stowed for travel. The pivoting feature may include an expanded width portion at an upper region of the support tube, such as to accommodate pivoting movement of a linkage arm associated with the storage bin. Optionally, a deployment assist mechanism, such as a torsion spring, is provided with the elevator system to assist in deploying the storage bin from above the trailer.

In one aspect, a linkage arm is disposed between the screw drive and the storage bin to raise and lower the storage bin relative to the upright wall of the trailer and, once the storage bin reaches the roof or top of the upright wall the linkage arm pivots the storage bin above the trailer. A pivot or hinge disposed between the storage bin and the support tube allows the storage bin to pivot from an upright orientation at or above the top of the trailer to a tipped-over stowed orientation atop the trailer. The linkage is moved as the lift element climbs up and down the screw drive. When the screw drive is reversed, the linkage is allowed to move downwardly as the lift element climbs down the screw drive, which pulls the storage bin and pivots it around the pivot into an upright orientation. Once the storage bin is in the upright orientation, the linkage allows the storage bin to move down toward the deployed position.

In another form of the present invention, a deployable storage elevator includes a cable winch and a cable that coordinate to raise and lower a storage bin. The winch is disposed on the roof of the trailer and retracts or extends the cable to raise and lower the storage bin between a stowed position on top of the trailer and a deployed position near a side or back of the trailer. The cable and winch pull the storage bin upward relative to an upright wall of the trailer and over the edge at the wall and roof of the trailer, and then pulls and slides the storage bin along the roof to the stowed configuration. In still another aspect, the elevator includes a deployment assist mechanism, which may include a handling platform or storage bin support frame disposed proximate an edge of the trailer wall and roof. The cable and winch pull the storage bin into the support frame. The bin support frame receives the storage bin as it raises relative to the trailer and secures the storage bin into the frame. Once the storage bin is fully received in the support frame, the winch and cable pull the support frame toward the winch, causing the support frame to pivot downward from an upright orientation toward the roof of the trailer until the support frame and storage bin are supported by the roof in a substantially flat orientation relative to the roof. Optionally, the deployment assist mechanism includes a torsion spring coupled with the support frame to assist in returning the support frame to an upright orientation to deploy the storage bin from above the trailer when the winch extends the cable.

In another aspect, the deployable storage elevator includes a control system disposed with the elevator to control the motor and to stop the motor when the hay reaches the fully stowed position or the fully deployed position. Preferably, a proximity sensor, motor speed control, or circuit controller is included with the control system to activate and de-activate the elevator as desired.

In yet another aspect, the storage bin is pivotable or rotatable relative to the trailer about either of a generally vertical axis that is substantially parallel to the vertical travel path of the elevator system, or a generally horizontal axis that is substantially perpendicular to the vertical travel path of the elevator and substantially parallel to the upright wall of the trailer respective to the elevator.

In another form of the present invention, a deployable elevator system includes a raising and lowering element to raise and lower a supply mount having a deployable corral extendably coupled to the mount. The deployable corral includes a plurality of corral panels extendably coupled to one another which, in a deployed configuration, define a fenced-in corral space, such as for corralling livestock. The elevator system raises the mount and corral to a stowed position for travel and lowers the mount and corral to a deployed position allowing a user to selectively deploy the corral as desired. Optionally, the supply mount includes a hay pod to provide storage for supplies and equipment, such as hay or livestock tack.

Accordingly, the deployable storage elevator of the present invention allows users to easily lift, stow, and deploy a storage bin containing supplies, such as hay, along the exterior of a vehicle such as a trailer, a recreational vehicle, a pickup truck, a pickup truck slide-in camper, a pickup truck bed rail, a pickup truck topper, an automobile roof top carrier, and various other motorized and non-motorized vehicles. The storage elevator can be actuated between raised, stowed, and lowered configurations using a drive system, such as a powered screw drive system that requires little more than pushbutton or remote actuation by an operator. When the storage elevator is integrated into a vehicle such as a towable trailer or a motor vehicle, its various components can be recessed into channels in order to avoid significantly altering the vehicle's overall length or width, and the storage bin(s) can be stowed above the vehicle to avoid blocking access around the trailer or vehicle.

These and other objects, advantages, purposes, and features of the present invention will become more apparent upon review of the following specification in conjunction with the drawings.

BRIEF DESCRIPTION OF THE DRAWINGS

FIG. 13 is a perspective view of a hay pod guide of the hay pod elevator of FIG. 8, depicted in a stowed configuration;

FIG. 14 is a top view of the hay pod guide of FIG. 13;

FIG. 15 is a front elevation view of the hay pod guide of FIG. 13, depicted in a deployed configuration;

FIG. 27 is a front-side perspective view of a transport trailer with deployable hay pod elevators and deployable corral in accordance with the present invention, shown with the hay pod elevators and corral in their respective deployed configurations;

FIG. 28 is a side elevation view of the transport trailer with deployable hay pod elevators and deployable corral of FIG. 27;

FIG. 30 is an elevation view of the deployable corral of FIG. 27, shown in its stowed configuration;

FIG. 31 is top plan view of the deployable corral of FIG. 30;

FIG. 31A is an enlarged view of the region designated 31A in FIG. 31; and

FIG. 32 is a perspective view of the deployable corral of FIG. 30.

DETAILED DESCRIPTION OF THE PREFERRED EMBODIMENTS

Figure 1:
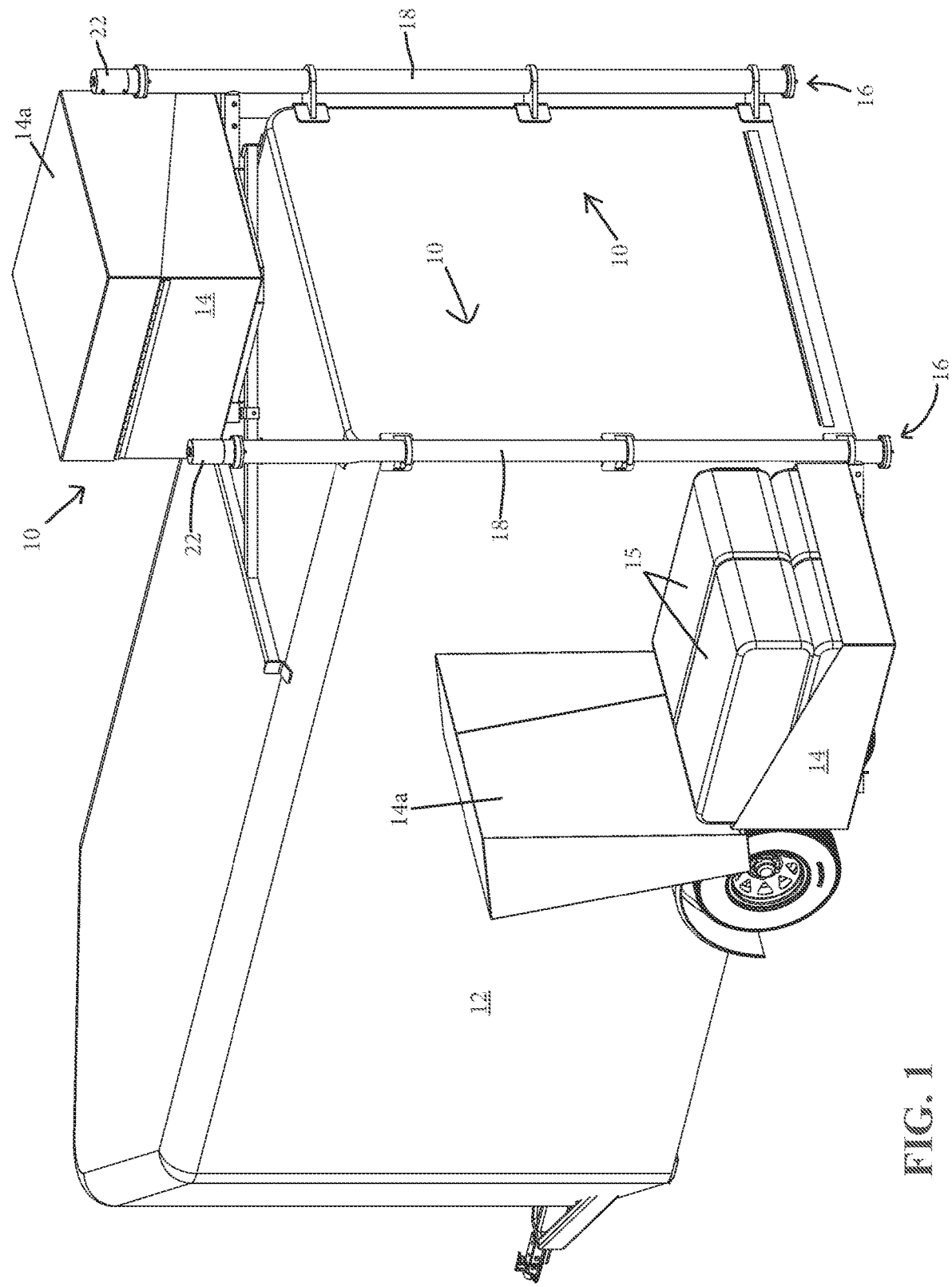
FIG. 1 is a rear perspective view of a transport trailer with deployable hay pod elevators in accordance with the present invention, shown with one hay pod elevator in a travel-ready configuration and one hay pod elevator in a deployed configuration.
Figure 2:
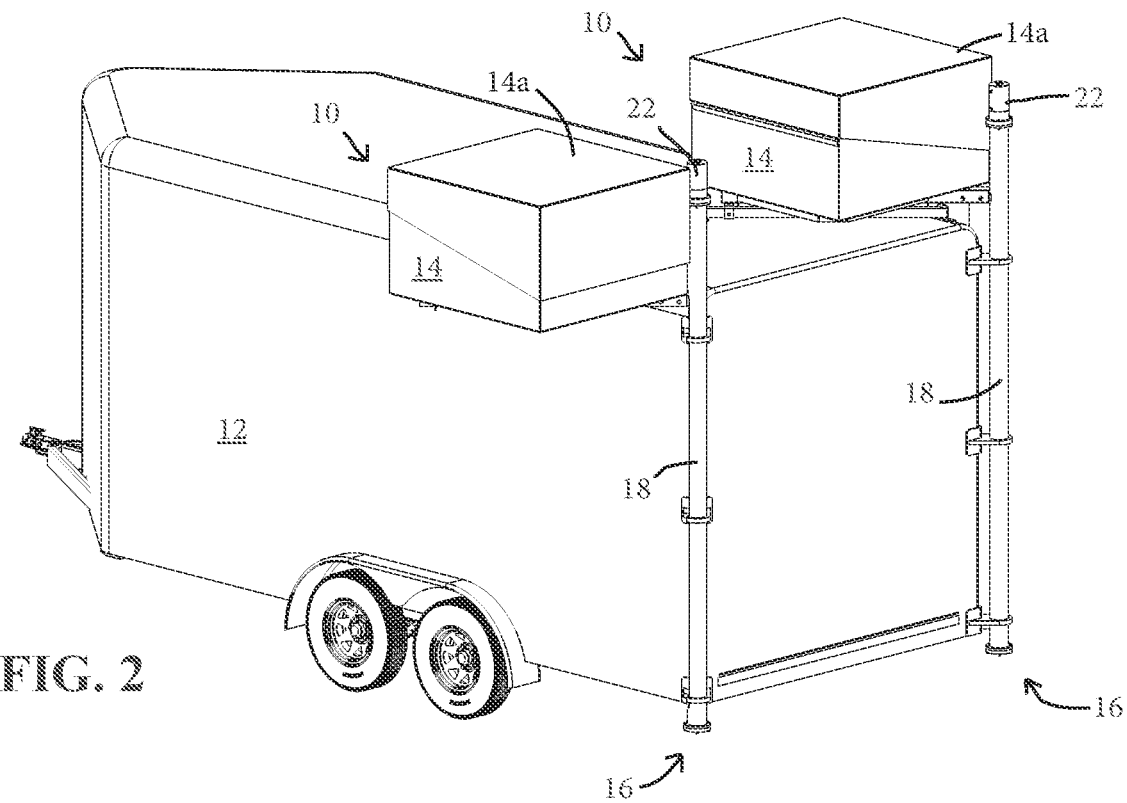
FIG. 2 is another perspective view of the deployable hay pod elevators of FIG. 1 shown with one hay pod in the travel-ready configuration and the other hay pod in a mid-deploying/stowing configuration.
Figure 3:
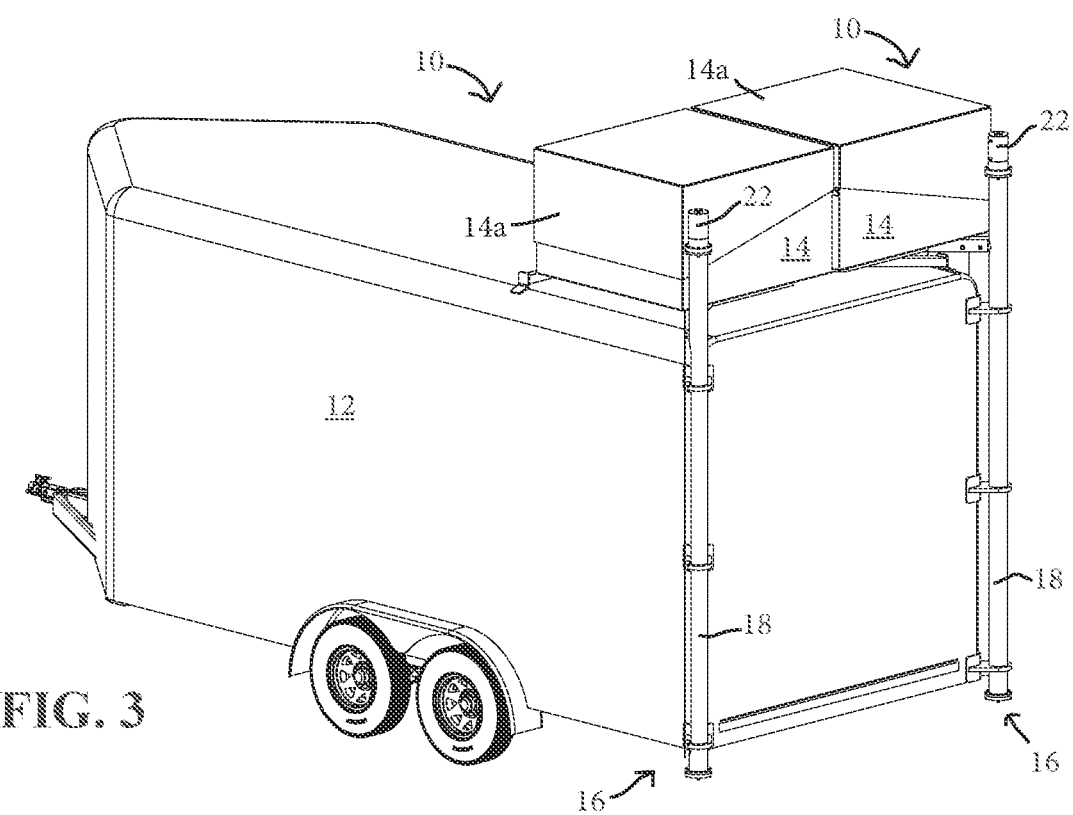
FIG. 3 is another perspective view of the deployable hay pod elevators of FIG. 1 shown with both hay pods in the travel-ready configuration.

Referring now to the drawings and the illustrative embodiments depicted therein, a transport trailer with integrated storage bin or hay pod elevator system 10 includes a transport trailer 12 such as a livestock trailer, a deployable and rotatable or pivotable supply mount, handling platform, storage bin, storage rack, or "hay pod" 14, and a vertical raising and lowering element such as a lift hoist 16 that raises and lowers the hay pod 14 relative to a front, side, or back of trailer 12, such as shown in FIGS. 1-3. It will be appreciated that while the term "hay pod" is used throughout this description, the hay pod 14 that is described and illustrated in the present application is representative of substantially any form of storage bin, supply mount, or platform for storage of various items, such as a flat deck or a rack for storing tools, equipment or other supplies. It will also be appreciated that only a single hay pod 14 and lift 16 may be provided, or that two or more hay pods 14 may be mounted on respective lifts 16 at the same, opposite, or adjacent sides of the trailer 12 to provide additional storage spaces, such as shown in FIGS. 1-3. It will be further appreciated that while the term "transport trailer" is used throughout this description, the trailer 12 that is described and illustrated in the present application is representative of substantially any form of transport vehicle and portions thereof, including recreational vehicles, pickup trucks, pickup truck slide-in campers, pickup truck bed rails, pickup truck toppers, automobile roof top carriers, and various other motorized and non-motorized vehicles. Further, it will be appreciated that the principles of the present invention may be applied to marine vessels or even non-vehicles such as storage buildings, without departing from the spirit and scope of the present invention.

In the illustrated embodiment of FIGS. 1-4, a hay pod elevator system 10 is provided at each of the rear corners of the trailer 12, each essentially self-contained and integrated into the trailer 12. The elevator system 10 is capable of manual or powered deployment and retraction by a single operator or user. The lift 16 is operable to raise the hay pod 14 to a height at or above the top of the trailer 12, and to rotate or pivot the hay pod 14 over the top of the trailer 12 once the hay pod 14 has cleared the top of the trailer 12 to stow the hay pod 14 for travel, as sequentially demonstrated in FIGS. 1-3, for example. The lift 16 is further operable to rotate or pivot the hay pod 14 out from over the top of the trailer 12 and to lower it down relative to the outside of the trailer 12 to a deployed configuration, as demonstrated in a reverse sequential order of FIGS. 1-3, for example.

Hay pod 14 deploys to provide a user outside the trailer 12 with convenient access to stored supplies or materials, such as stored food for animals, for tools, tack, camping supplies, or substantially any other goods that are desired for storage on a trailer or other vehicle. Hay pod 14 includes a door or lid 14a that is openable and closeable to provide selective access to the hay pod contents, such as hay bales 15, and that may protect the hay pod contents from insects, rain, or other contaminants. Thus, the transport trailer with integrated hay pod elevator system 10 greatly simplifies storage of hay or animal feed above a trailer so as to reduce or eliminate much of the manual lifting that is usually associated with temporary care of livestock. While the pivotable supply handling platform is illustrated as a hay pod 14 that includes side walls and an optional door or lid 14a, it will be appreciated that a flat deck or platform or rack may form the pivotable supply handling "platform" to support large equipment or supplies, such as lawn mowers, carts, buggies, other equipment or tools, or building construction materials, for example. Any of these features may be combined, such as a flat deck or platform or rack that supports a storage bin, or a storage bin with hooks, latches, or other provisions for securing other equipment, tools, or the like to its external or internal surfaces. Moreover, the term "platform" may be used to refer to substantially any storage bin or rack, deck, or the like.

Figure 4:
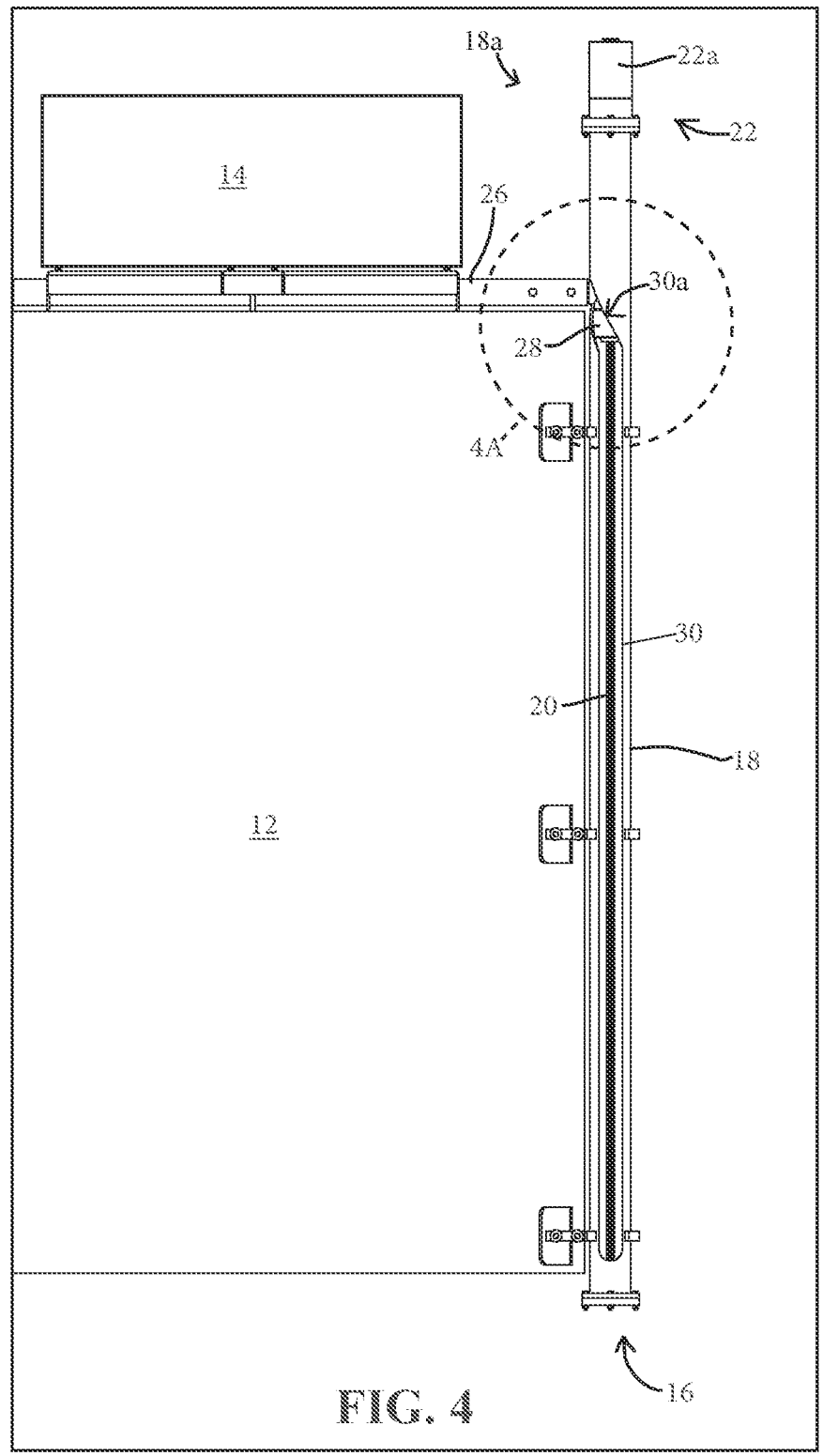
FIG. 4 is a sectional view of a support tube of a deployable hay pod of FIG. 1.
Figure 4A:
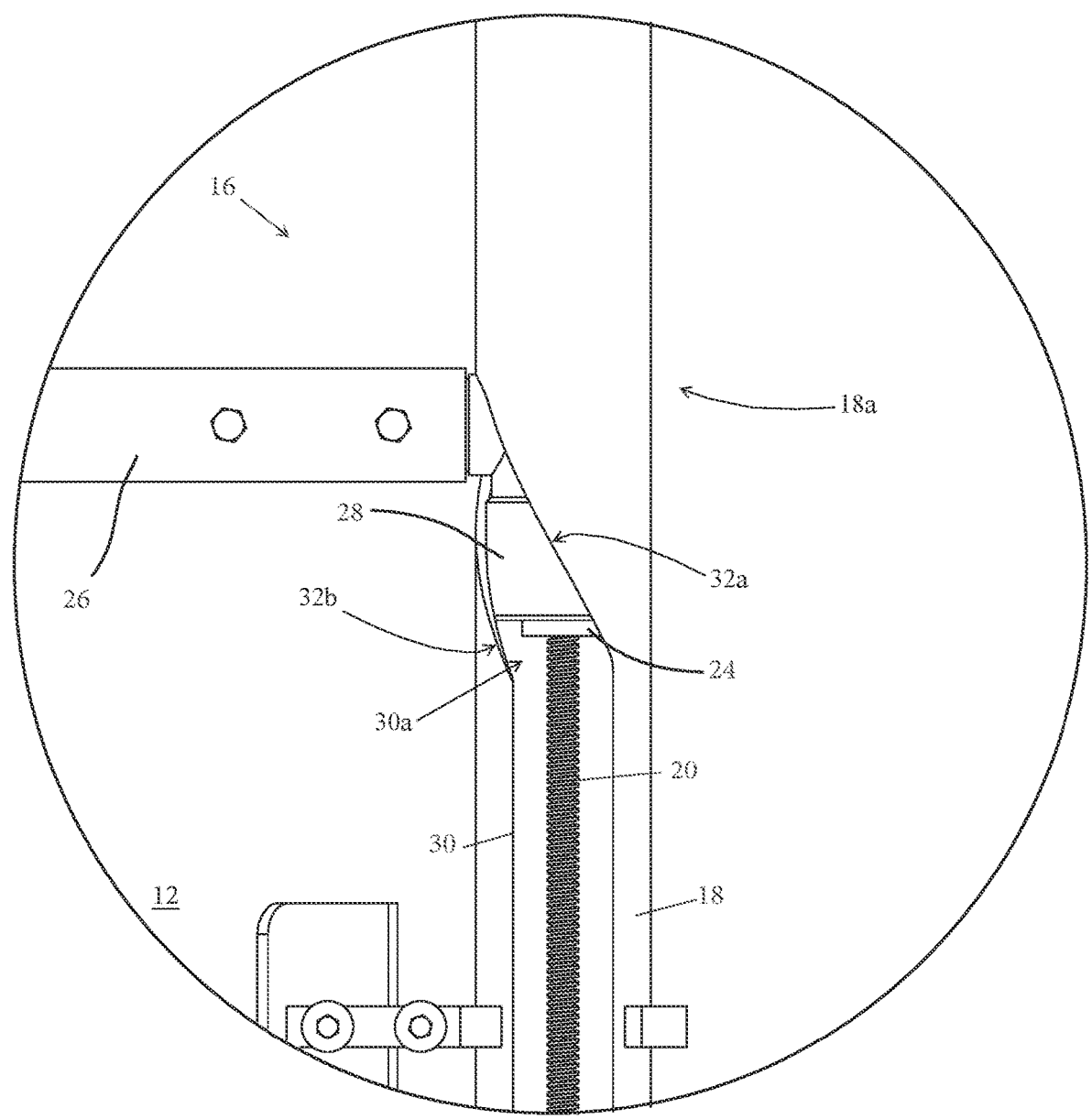
FIG. 4A is an enlarged view of the region designated 4A in FIG. 4.
Figure 5:
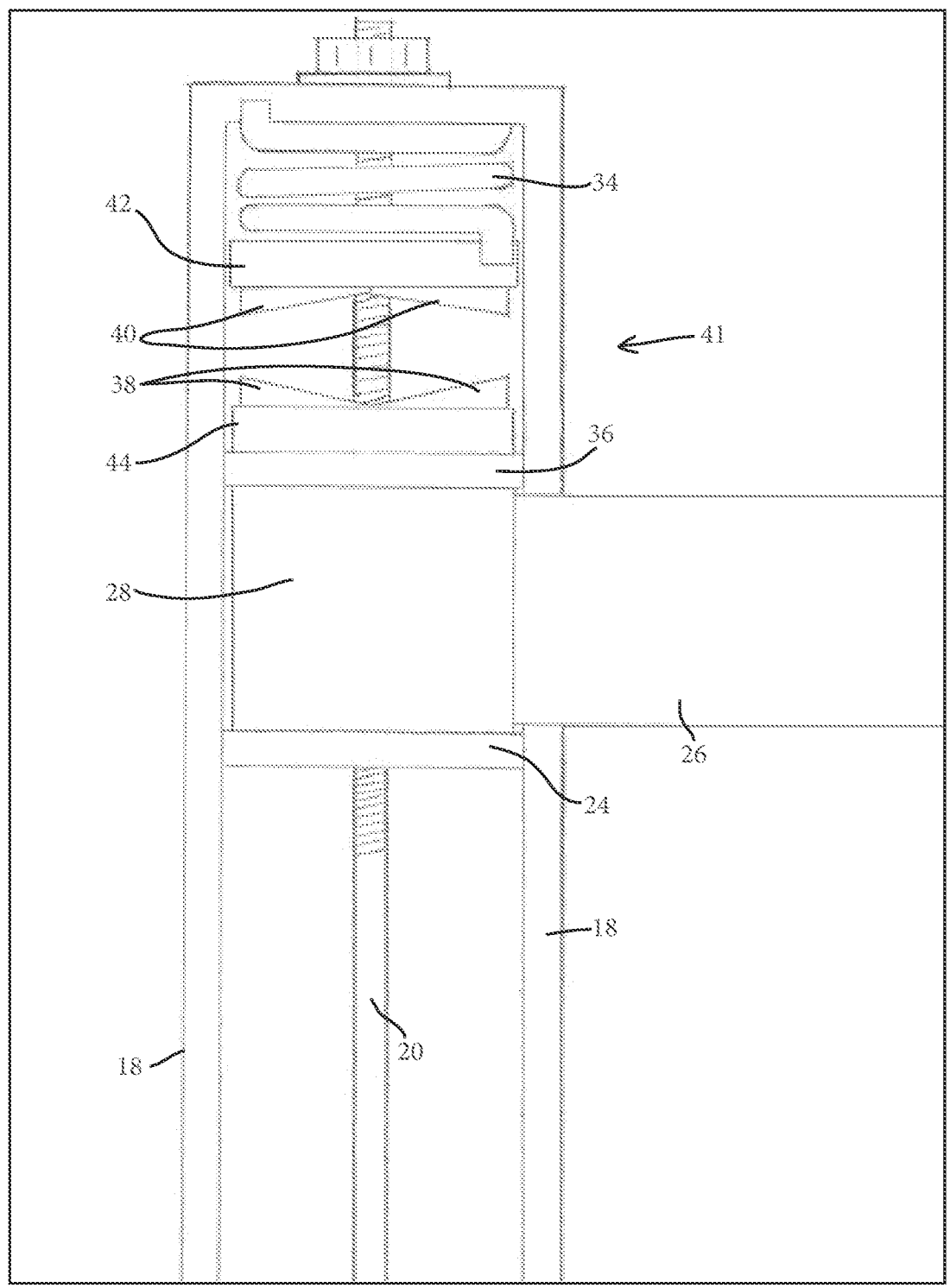
FIG. 5 is a sectional view of the upper portion of another support tube for another deployable hay pod elevator in accordance with the present invention, including a return assist system with a torsion spring and engagement teeth.

Referring to the elevator system 10 in FIGS. 1-4A, the lift 16 includes an elevator support tube 18 that is substantially equal in length to the height of the trailer 12 and extends at least partially above the top of the trailer 12. The lift 16 defines a vertical travel path that is substantially parallel to and alongside of the adjacent upright wall of the trailer 12. The lift 16 includes a lead screw 20 disposed inside the support tube 18 (FIG. 4) coupled to a screw drive system 22 (FIGS. 4-8) that rotationally drives the lead screw 20. The lead screw 20 threadedly engages a lower bearing block 24 inside the support tube 18, such as shown in FIGS. 4A and 5. As the lead screw 20 spins, the lower bearing block 24 climbs or descends the lead screw 20, depending on the spin direction and the configuration of the threads of the lead screw 20 and lower bearing block 24. The lower bearing block 24 provides a low friction support for a support arm 26 of the hay pod 14, such that as the lower bearing block 24 climbs or descends the lead screw 20, the hay pod 14 is lifted or lowered by the lower bearing block 24 relative the lead screw 20. The support arm 26 includes a support cylinder 28 that fits inside the support tube 18 and provides support for the support arm 26 against the support tube 18 to resist pivot (bending moment) forces caused by the cantilevered configuration of the hay pod 14. The support cylinder 28 is supported on the lower bearing block 24 and disposed around the lead screw 20 without engaging the threads of the lead screw 20, such that the lead screw 20 can freely rotate within the support cylinder 28. Optionally, the screw drive system 22 includes a motor 22a (FIG. 4) provided to drive the lead screw 20 to actuate the hay pod 14 in a manner that will be more fully described below.

The support tube 18 includes a keyway 30 disposed along the length of the support tube 18 (FIGS. 4 and 4A). The keyway 30 provides a guide or track along which the support arm 26 freely passes as the hay pod 14 raises or lowers. In the illustrated embodiment, a majority of the length of the keyway 30 is linear, of fixed width, and parallel to the lead screw 20, such that the support arm 26 travels substantially linearly (vertically) for a majority of its travel through the keyway 30. The keyway 30 prevents the support arm 26 and hay pod 14 from freely rotating with the lead screw 20 as the lead screw turns. As best shown in FIGS. 4 and 4A, the keyway 30 includes an upper expanded-width region or portion 30a having a spiral or helical shape defined by an upper ramp or cam surface 32a and a lower ramp or cam surface 32b that each direct or guide the support arm 26 to rotate relative to the support tube 18 as the support arm 26 is lifted and lowered, respectively. As the support arm 26 approaches the upper keyway portion 30a from below, the support arm 26 tracks along upper cam surface 32a, forcing the support arm 26 and hay pod 14 to pivot around the longitudinal axis of the lead screw 20 and over the top of the trailer 12 into a stowed travel configuration as the support arm 26 reaches the upper end of its travel. As the lead screw 20 reverses, such that the lower bearing block 24 travels downward relative to the lead screw 20, the support arm 26 tracks along the lower cam surface 32b, causing the support arm 26 and hay pod 14 to pivot around the lead screw 20, out and away from the top of the trailer 12, and then down into a deploying configuration as the support arm 26 traverses down the generally linear part of the keyway 30.

Figure 6:
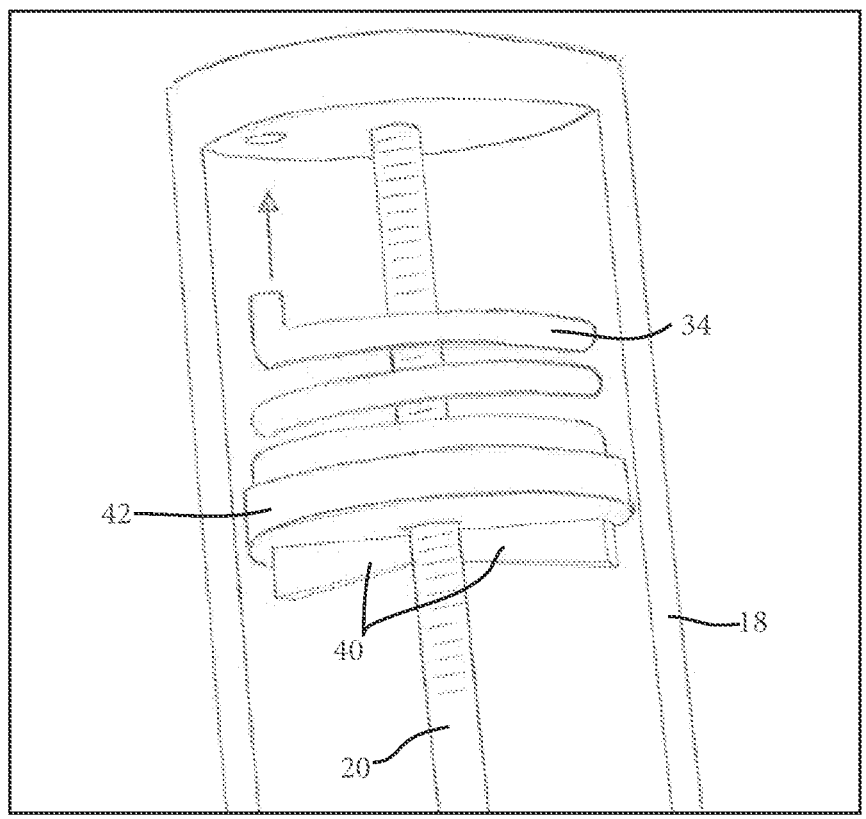
FIG. 6 is a partially exploded perspective view of a lead screw, torsion spring, and upper engagement teeth of the deployable hay pod elevator of FIG. 5.
Figure 7:
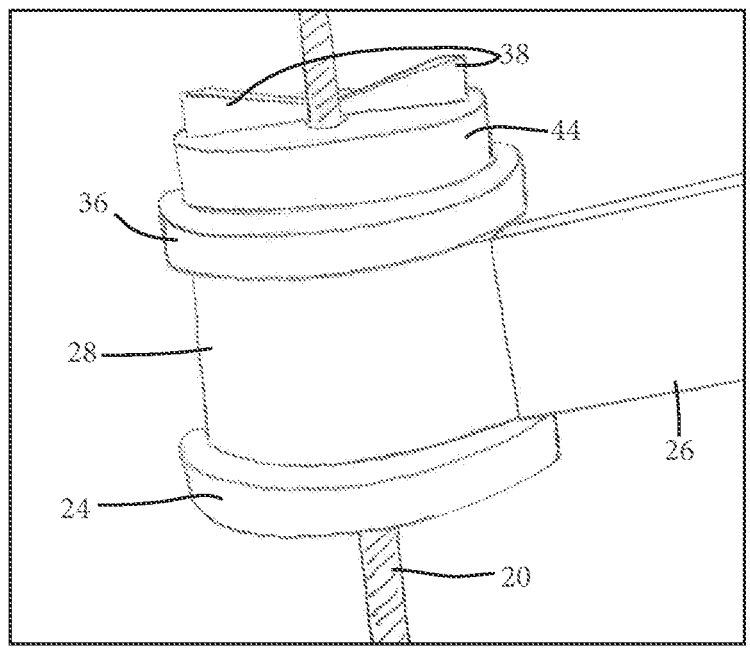
FIG. 7 is a perspective view of the lead screw, support arm, and lower engagement teeth of the deployable hay pod elevator of FIG. 5.

Optionally, and as shown in FIGS. 5-7, a torsion spring 34 is rotationally fixed at an upper portion 18a of the support tube 18 and disposed above the support arm cylinder 28. The torsion spring 34 stores energy as the support arm 26 travels up through the spiral-shaped upper region 30a of the keyway, and provides return assistance to the hay pod 14 to assist in turning or pivoting the hay pod 14 from the stowed configuration above the trailer 12 out away from the top of the trailer 12 and into the deploying configuration. As the lead screw 20 lifts the lower bearing block 24, thereby lifting the support arm cylinder 28, an upper bearing block 36 that rests atop the support arm cylinder 28 (and remains rotationally fixed to the support arm cylinder 28) eventually approaches a lower portion of the torsion spring 34. An engagement element 41, disposed between the upper bearing block 36 and the torsion spring 34, provides a rotational interaction point between the support arm cylinder 28 and the torsion spring 34 (FIG. 5). As the support arm 26 tracks along upper cam surface 32a and pivots around the longitudinal axis of the lead screw 20, the engagement element 41 causes the torsion spring 34 to twist in the same direction as the rotation of the lead screw 20, thereby storing rotational energy in the spring 34 as the hay pod 14 rotates into the stowed position above the trailer 12. When the lead screw 20 reverses to lower the lower bearing block 24, the stored energy in the torsion spring 34 cooperates with the lower cam surface 32b to force the hay pod 14 to pivot out and away from the top of the trailer 12 as the support arm 26 traverses in a spiral manner through the spiral-shaped upper region 30a of the keyway 30.

As illustrated in FIGS. 5 and 7, the upper bearing block 36 supports a lower support arm engagement disk 44 that includes a set of lower engagement teeth 38. The lower engagement disk 44 and its engagement teeth 38 remain rotationally fixed relative to the upper bearing block 36 and the support arm cylinder 38, so that engagement teeth 38 rotate with the support arm 26 and hay pod 14. A set of upper engagement teeth 40 extends downwardly from an upper spring engagement disk 42 that is rotationally fixed to a lower portion of the torsion spring 34 (FIGS. 5 and 6). The engagement teeth 38, 40 interact with each other as the support arm cylinder 28 raises and approaches or enters the spiral-shaped upper region 30a of the keyway 30. As the support arm 26 tracks along the upper cam surface 32a and continues to rise as a result of the upward force of the lower bearing block 24, the engagement teeth 38, 40 initiate interaction with each other. The interaction between the engagement teeth 38, 40 causes the torsion spring 34 to twist and store torsional energy as the support arm 26 is forced to rotate by the upper cam surface 32a. The stored torsional energy increases as the hay pod 14 pivots fully over the top of the trailer 12. The torsional energy in the torsion spring 34 is stored while the hay pod 14 is in the stowed configuration. As the lead screw 20 reverses to deploy the hay pod 14, the torsion spring 34 releases its stored torsional energy and transfers it between the engagement teeth 38, 40 to the support arm cylinder 28, thereby adding twisting force to the support arm cylinder 28. The twisting force on support arm cylinder 28, along with the lower cam surface 32b guiding the support arm 26, coordinate to pivot the hay pod 14 out and away from the top of the trailer 12 into a deploying configuration for subsequent lowering alongside the trailer.

Optionally, the engagement teeth 38, 40 may be formed as a plurality of dimples, bumps, or raised features disposed on the mating surfaces of a spring engagement disk 42 and the support arm engagement disk 44. The raised features create increasing frictional and/or direct lateral contact between respective portions of the spring engagement disk 42 and the support arm engagement disk 44 as the support arm cylinder raises toward the torsion spring 34. The frictional and/or direct lateral contact causes the torsion spring 34 to twist as the hay pod 14 raises and pivots above the trailer 12 to store increasing torsion force in the torsion spring 34. The frictional and/or direct lateral contact between disks 42, 44 continues until the hay pod 14 is deployed and the support arm cylinder 28 has lowered to a point that the torsion spring 34 has returned to its equilibrium length and the disks 42, 44 are no longer in contact.

Figure 8:
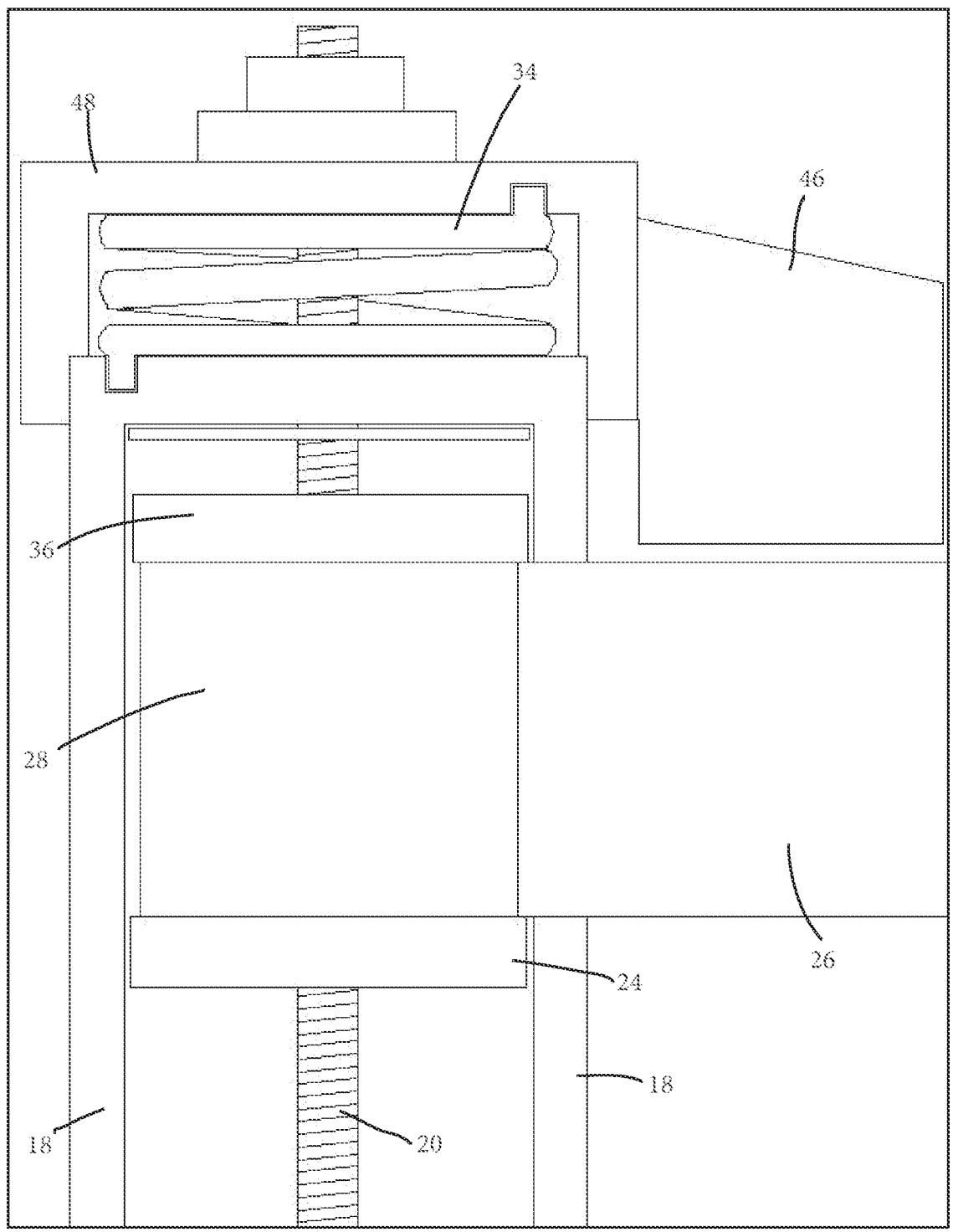
FIG. 8 is a sectional view of an upper portion of another support tube for a deployable hay pod elevator in accordance with the present invention, including a return assist system with a torsion spring and spring engagement paddle.

Optionally, and as an alternative to the engagement teeth 38, 40, a spring-loaded paddle or tab 46 is fixedly coupled to a torsion spring cap 48, such as shown in FIG. 8. The torsion spring cap 48 is rotationally disposed over the upper portion 18a of the support tube 18 and houses the torsion spring 34 between the cap 48 and the top of the support tube 18. The spring cap 48 is rotatable about the longitudinal axis of the lead screw 20 such that rotation of the spring cap 48 in one direction causes the spring 34 to store energy, and rotation of the spring cap 48 in the opposite direction causes the spring to release the stored energy. To achieve this, the torsion spring 34 is rotationally fixed at its upper end to an upper portion of the spring cap 48 and is rotationally fixed at its lower other end to an upper portion of the support tube 18 (FIG. 8). As the support arm 26 tracks along the upper cam surface 32*a* and continues to rise as a result of the lift of the lower bearing block 24, the support arm 26 initiates interaction with the spring paddle 46. The interaction between the spring paddle 46 and the support arm 26 causes the torsion spring 34 to twist and store torsional energy as the support arm 26 traverses the spiral-shaped upper region 30*a* of the keyway 30 (not shown in FIG. 8). The stored torsional energy increases as the hay pod 14 pivots over the top of the trailer 12, and the torsional energy in the torsion spring 34 is stored while the hay pod 14 remains in the stowed configuration. As the lead screw 20 reverses to deploy the hay pod 14, the torsion spring 34 releases its stored torsional energy and transfers it to the support arm 26 and hay pod via the spring paddle 46, thereby applying a torsional force to the support arm 26. The spring's torsional force on support arm 26 and the lower cam surface 32*b* cooperate to force the support arm 26 to pivot the hay pod 14 out and away from the top of the trailer 12 into a deploying configuration as the support arm spirals downwardly through the spiral-shaped upper region 30*a* of the keyway 30.

Optionally, an actuation control system is provided to control and reduce the actuation speed of the lead screw 20. The actuation control system may include a switch disposed at the hoist 16 to de-energize the motor 22*a* once the hay pod 14 reaches the fully stowed position or the fully deployed position. Preferably, a proximity sensor, motor speed control, or circuit controller is in communication with the control system to automatically control the operation of the motor 22*a* by limiting actuation of the hay pod 14 to a safe range of travel and appropriate travel speeds as it moves between the fully stowed and fully deployed positions.

Figure 11:
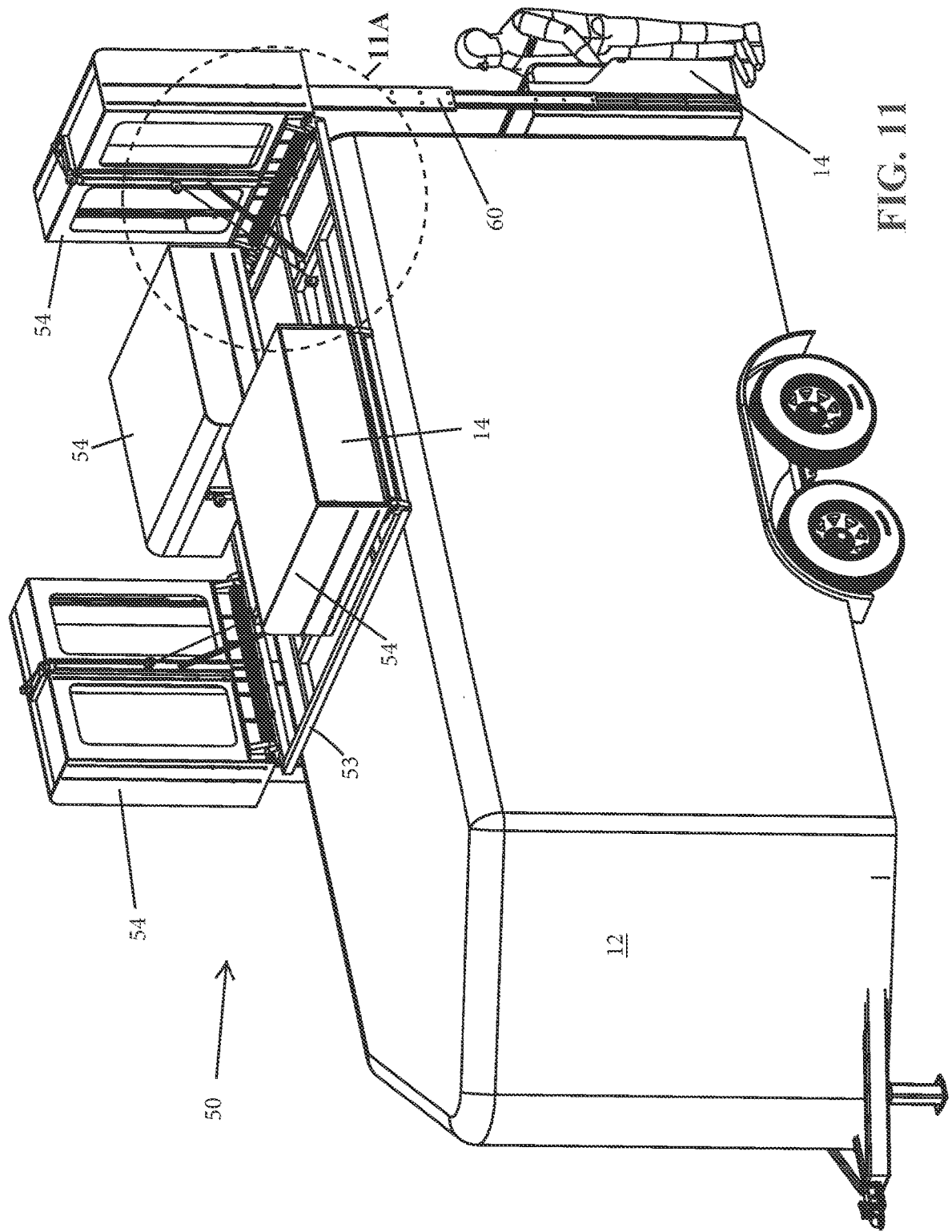
FIG. 11 is a front-side perspective view of the deployable hay pod elevators of FIG. 9, depicted with two of the hay pods in the travel-ready configuration and the other two hay pods in the deployed configuration.
Figure 11A:
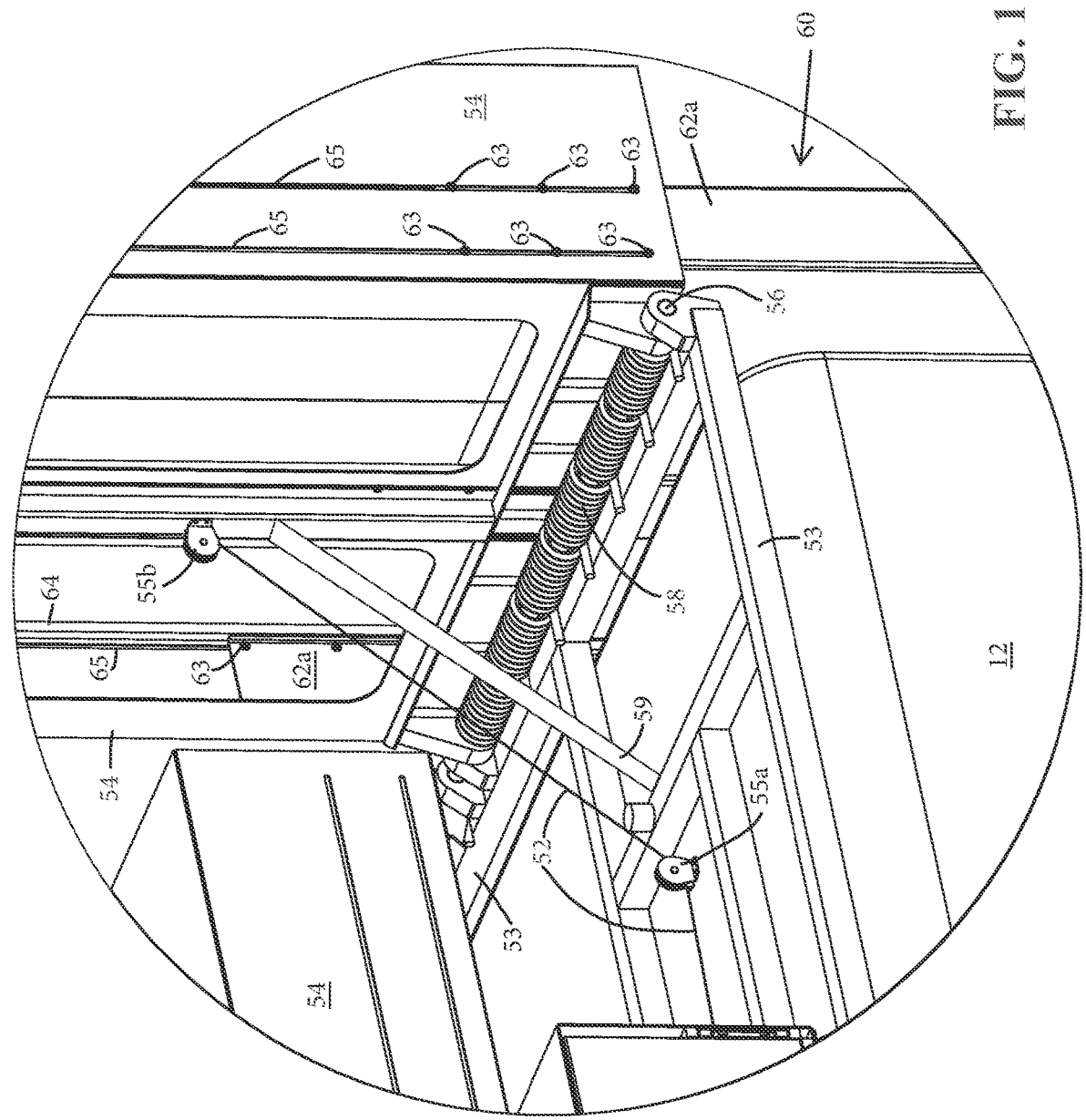
FIG. 11A is an enlarged view of the region designated 11A in FIG. 11.
Figure 12:
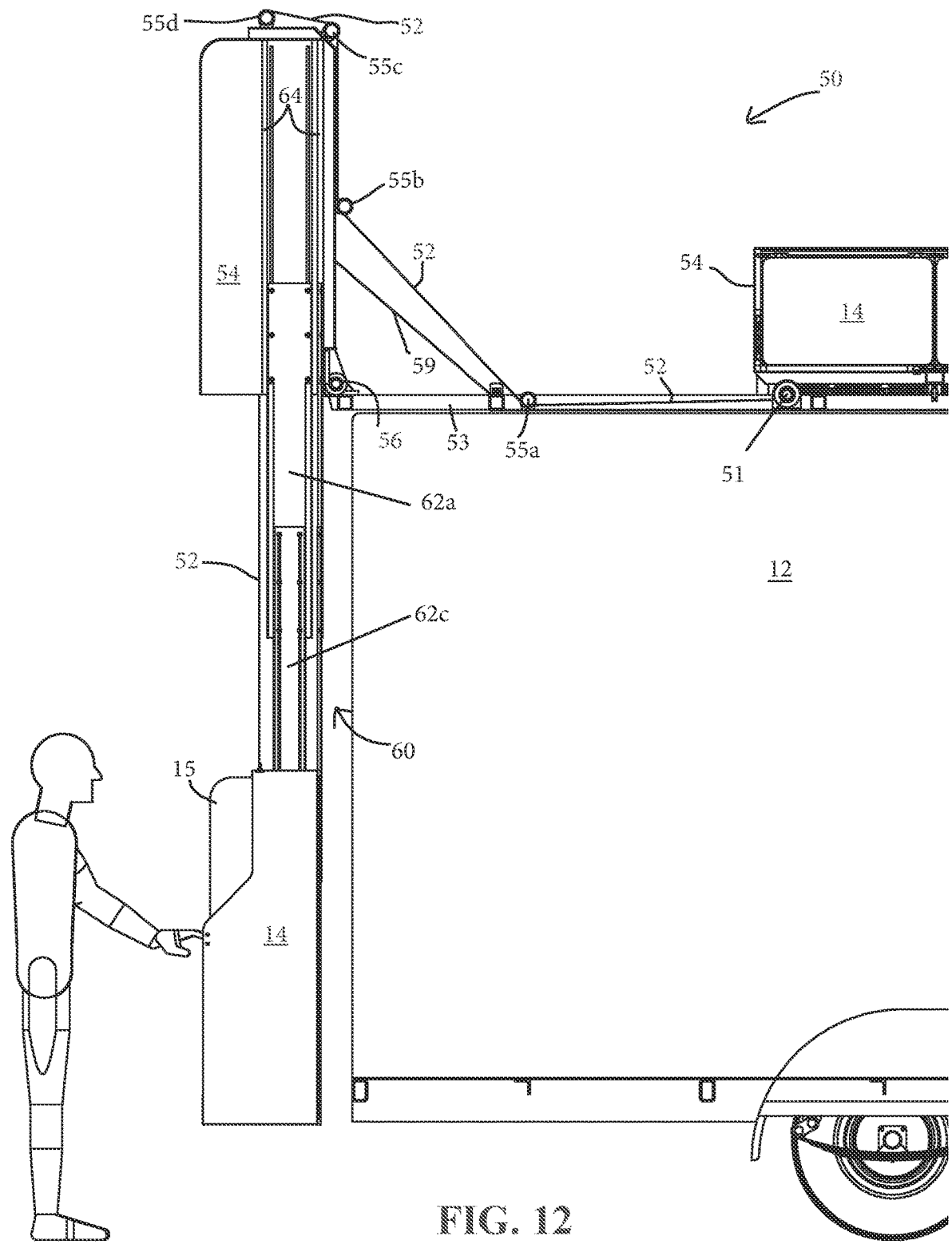
FIG. 12 is a partial-sectional side elevation view of a rear portion of the trailer and the hay pod elevator of FIG. 9, depicted in a deployed configuration.

Turning now to FIGS. 9-12, a vertical raising and lowering element in the form of a lift hoist 50 provides lifting and lowering capability for a deployable supply handling platform such as a hay pod 14. Referring to FIG. 12, the hoist 50 includes an electric winch 51 mounted along a roof panel of the trailer, a winch cable 52, a hay pod support box 54, and a support box hinge 56. The pod support box 54 receives or accepts the hay pod 14 at the upper range of the hay pod's travel to support the hay pod 14 during final stowing or initial deployment, and while stowed atop the roof for travel. The support box 54 is coupled at one end to the hinge 56, which is disposed proximate an edge of the roof of the trailer 12. The hinge 56 provides a pivot point for the support box 54 to pivot about a generally horizontal axis from a stowed configuration substantially above the trailer 12, to a deployed position extending laterally beyond the exterior wall of the trailer 12, as illustrated in FIG. 11. A lanyard or tether 59 is provided for limiting the forward tilt of the support box 54 after it has been pivoted to the deployed position (FIG. 11A). The hay pod is coupled to a free or distal end of the winch cable 52, which is attached at its opposite end to the winch 51. The cable 52 is routed through a series of pulleys 55*a-d* which are positioned in spaced arrangement for lifting and lowering the hay pod 14, and for pivoting the hay pod 14 and support box 54 to the stowed position in response to the winch 51 drawing in the cable 52. As shown in FIG. 12, the pulleys include a roof pulley 55*a* at the top of the trailer 12, spaced between the winch 51 and the roof edge and directly beneath the support box 54 when the support box is in the stowed configuration. Next the cable 52 is routed to a middle pulley 55*b* near a midpoint of the support box 54, then to an upper/inboard pulley 55*c* at an upper/inboard corner of the support box, and then to a hoist pulley 55*d* and down through the support box 54 to the hay pod 14 (FIGS. 11A and 12). The winch 51 retracts or extends the cable 52 to raise or lower the hay pod 14, respectively. Operation of the winch 51 also pivots the support box 54 and hay pod 14 together about the hinge 56 to the stowed configuration once the hay pod 14 is fully raised and received in the support box 54. The hoist 50 includes a hoist frame 53 fixed to an upper portion of the roof of the trailer 12. The frame 53 provides a base upon which various components of the hoist 53 (including the winch 51, roof pulley 55*a*, and hinge 56) are fixedly attached while also providing a rest or support for the hay pod support box 54 and hay pod 14 when the hay pod 14 is in the stowed configuration.

Figure 9:
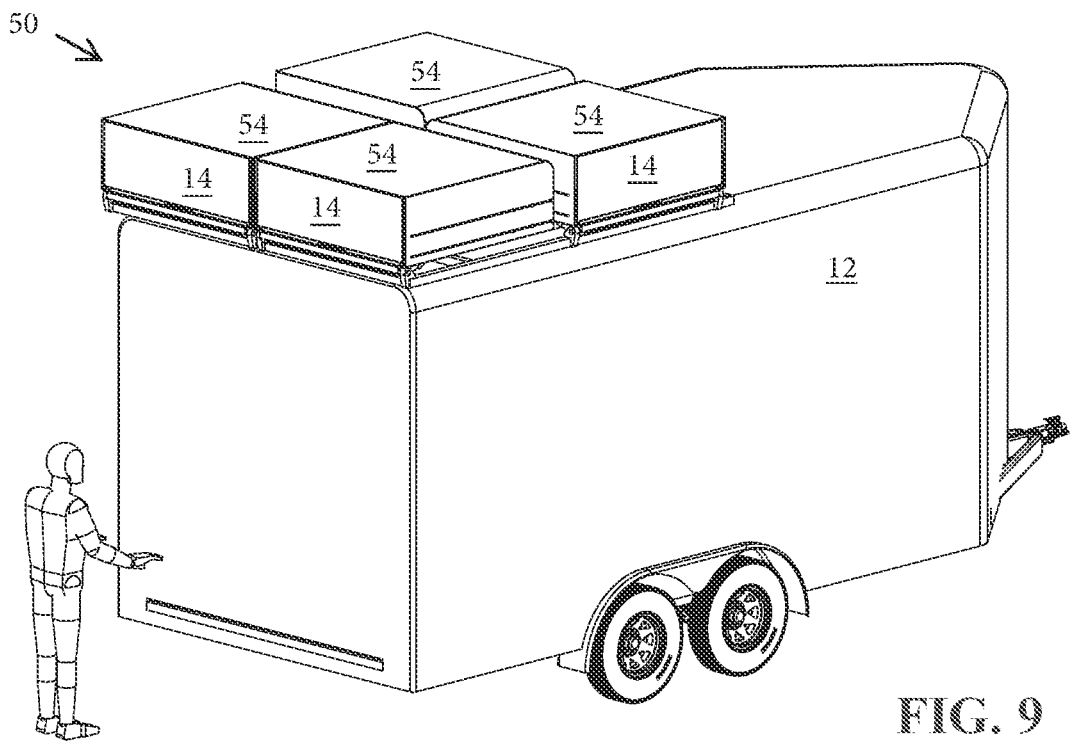
FIG. 9 is a rear-side perspective view of a transport trailer with another deployable hay pod elevator in accordance with the present invention, including four deployable hay pods depicted in a travel-ready configuration.
Figure 10:
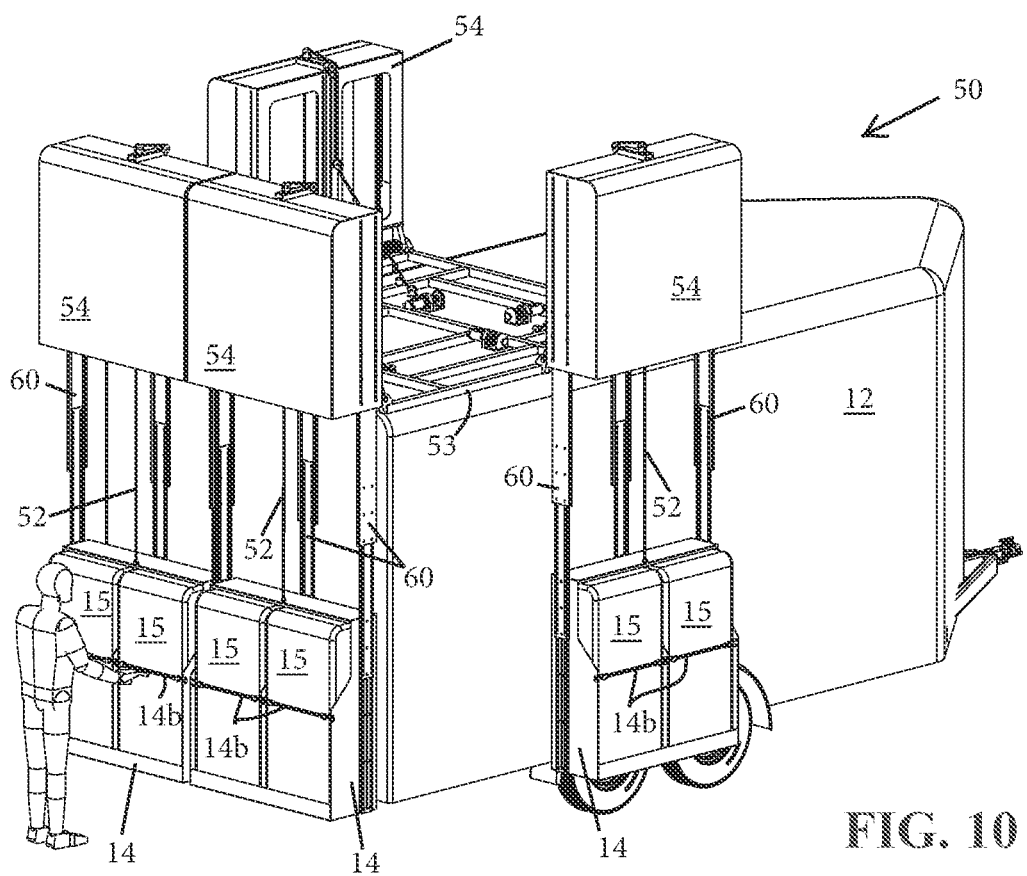
FIG. 10 is another rear-side perspective view of the elevator of FIG. 9, with the four deployable hay pods depicted in a deployed configuration.

In a fully deployed configuration, the hay pod 14 is positioned proximate a lower portion of the trailer 12, the cable 52 is extended from the winch 51, and the support box 54 is pivoted upright relative the roof of the trailer 12 (FIG. 12). In a stowed configuration, the hay pod 14 is received in the support box 54 which is then pivoted flat relative the roof of the trailer 12 by further retracting the cable 52 into the winch 51 (FIG. 9). During stowage of the hay pod 14, the cable 52 is retracted into the winch 51, which raises the hay pod 14 toward the support box 54. As the hay pod 14 approaches the support box 54 it enters into the space defined by the support box 54, which engages and supports the hay pod 14. Once the hay pod 14 has been fully received by the support box 54, the cable 52 continues to retract and begins drawing the support box 54 over the roof of the trailer, causing the support box 54 to tilt or pivot backward about the hinge 56 toward its stowed configuration. When the cable 52 is fully retracted by the winch 51, the support box 54 and hay pod 14 are positioned in the fully stowed configuration, as shown in FIG. 9.

Referring to FIG. 11A, a torsion spring 58 is disposed at the hinge 56 to assist the deployment and stowage of the hay pod 14. The torsion spring 58 is coupled between the support box 54 and the hoist frame 53 to provide torsion force to assist the pivoting of the support box 54 during actuation. As the cable 52 is retracted and the support box 54 is tilted toward the stowed configuration, the torsion spring 58 twists and stores torsional energy in the spring 58, while also preventing the support box 54 (and the hay pod 14 contained therein) from pivoting freely and falling due to gravity onto the hoist frame 53 or trailer roof once its center of gravity is moved inboard of the hinge 56. Once the support box 54 is in the fully stowed position, the torsion spring stores the torsional energy until the hay pod 14 is to be deployed. During deployment, the winch 51 extends the cable 52 and the torsional energy stored in the torsion spring 58 is released. The released torsional energy provides pivoting force to the support box 54 that lifts the support box 54 toward its upright deployed configuration of FIGS. 10-12. When the support box 54 reaches its fully upright deployed configuration, the weight of the hay pod 14 is substantially supported by the cable 52. The lanyard 59 counteracts any remaining torsional energy from the spring 58 and the weight of the support box 54 and hay pod 14 to retain the support box 54 at the desired upright deployed configuration. As the winch 51 further extends the cable 52, the hay pod 14 lowers downwardly out of engagement with the support box 54 and continues down alongside the trailer 12 toward the fully deployed configuration.

The support box 54 of the hoist 50 includes a hay pod guide 60 (FIGS. 10-15) disposed between the support box 54 and the hay pod 14, which maintains an additional connection (in addition to cable 52, which is reeved around the hoist pulley 55d at the support box 54) between the support box 54 and the hay pod 14 as the hay pod is lowered out of the support box 54. During stowage of the hay pod, the hay pod guide 60 directs the hay pod 14 into position within the support box 54 and, in coordination with the cable 52, further supports the hay pod 14 in the support box 54. The hay pod guide 60 also stabilizes the hay pod 14 so that it cannot spin or swing on the cable 52 in the deployed position below the support box 54. Optionally, an assist mechanism, such as a spring or hydraulic cylinder or gas-charged strut, is disposed with the hay pod guide 60 or between the hay pod guide 60 and the support box 54 to assist in deployment and retraction of the hay pod 14 relative to the support box 54. While the illustrated embodiments depict a plurality of hay pod guides 60 coupled to each hay pod 14, a single hay pod guide 60 may provide sufficient stability and guidance of the hay pod 14. Alternatively, the hay pod 14 may be suspended solely by the winch cable and allowed to freely hang alongside the upright wall of the trailer 12 when the hay pod 14 is in the deployed or deploying configurations. Such an embodiment is disclosed in commonly assigned U.S. provisional application Ser. No. 62/834,443 filed Apr. 16, 2019, from which U.S. Pat. No. 11,420,547 issued Aug. 22, 2022 claims priority, and which is hereby incorporated herein by reference.

As illustrated in FIGS. 12-15, the hay pod support guide 60 includes a plurality of telescoping support bodies 62 which are coupled together in a telescoping fashion and are telescopically extendable relative to one another. For example, the telescoping support bodies 62 may extend and retract similar to a multi-stage mast of a forklift. The quantity of support bodies 62, the length of each support body 62, and the length of the overall support guide 60, are each determined as a function of the desired height of the hay pod 14, when fully deployed, relative to the bottom of the trailer 12. The first and largest support body 62a forms the upper portion of the support guide 60 when the hay pod 14 is fully deployed, while the last and smallest support body 62b forms the lower portion of the support guide 60. The largest support body 62a is moveably engaged with a pair of support guide rails 64, which are mounted to an interior portion of the support box 54, the smallest support body 62b is fixed to the hay pod 14, and one or more intermediate support bodies 62c may be coupled between the largest and smallest support bodies 62a, 62b.

The support guide rails 64 are coupled to the hay pod support box 54 to guide the largest telescoping support body 62a as the support guide 60 extends and retracts during deployment and stowage of the hay pod 14 (FIGS. 13-15). The support guide rails 64 are mounted to interior surfaces of respective sidewalls of a given support box 54 such that when the support box 54 is in the upright configuration, the guide rails 64 are substantially vertical. In addition to, or alternative to, the pair of support guide rails 64, the largest telescoping support body 62a may have its upper end region moveably coupled to the support box 54 via a plurality of fasteners 63 fixed that extend through and slideably engage a respective one of a pair of slots 65 (FIG. 11A). The slots 65 are disposed through sidewalls of the support box 54 and positioned such that the slots 65 are substantially vertical when the support box 54 is in the fully upright configuration. The slots 65 are dimensioned to allow the fasteners 63 to move freely up and down along the slots 65 when the box 54 is in the upright configuration, while also retaining the fasteners 63 from exiting or pulling out of the slots 65 horizontally. The remainder of the support bodies 62 are similarly telescopically coupled to the adjacent support bodies 62, with guide rails and/or fasteners and slots, similar to that described above. The support guide 60, including the support bodies 62 and guide rails 64 may be formed from a resilient, sufficiently rigid material such as steel, aluminum, polyethylene (such as ultra-high molecular weight (UHMW) polyethylene), or a combination of these or other suitable materials.

As the hay pod 14 descends from the support box 54 while deploying, the plurality of support bodies 62 begin to move downward along the guide rails 64 and/or slots 65 until the first and largest support body 62a is fully extended relative to the support box 54 (FIG. 11A). The remainder of the yet-to-be extended support bodies 62b, 62c continue to telescopically extend in a similar manner until the hay pod 14 is in the fully deployed configuration (FIG. 12). While stowing, as the hay pod 14 ascends toward and into the support box 54, the plurality of support bodies 62 move upward in reverse of that described above, until the hay pod 14 is fully received into the support box 54. The support guide 60 preferably has a minimal profile thickness, such as by nesting the support bodies as shown in FIG. 14, to reduce the overall footprint of the hay pod 14 and hoist 50.

In another embodiment, as illustrated in FIGS. 16-20A, another vertical raising and lowering element such as a lift hoist 66 is provided to deploy and stow a deployable supply handling platform such as a hay pod 14 similar to that described above for hoist 50, including the hay pod support box 54 and optional hay pod support guide 60. The hoist 66 includes an electric winch 68 having an extendable and retractable cable 70 that is attached at the cable's free end to a hay pod 14, and at its other end to the winch 68. The winch 68 and the cable 70 coordinate to raise and lower the hay pod 14 relative to the exterior of the trailer to stow or deploy the hay pod 14. The cable 70 is routed through a series of pulleys 72a-d which are positioned in spaced arrangement at various locations, including the top of the trailer 12 and along the support box 54 (FIGS. 18A-20A), and which are configured and used in substantially the same way as the pulleys 55a-d described above. The hoist 66 includes a hoist frame 67 fixed to an upper portion of the roof of the trailer 12. The frame 67 provides a base upon which various components of the hoist 66 are fixedly attached while also providing a rest or support for the hay pod support box 54 and hay pod 14 when the hay pod 14 is in the stowed configuration.

Figure 16:
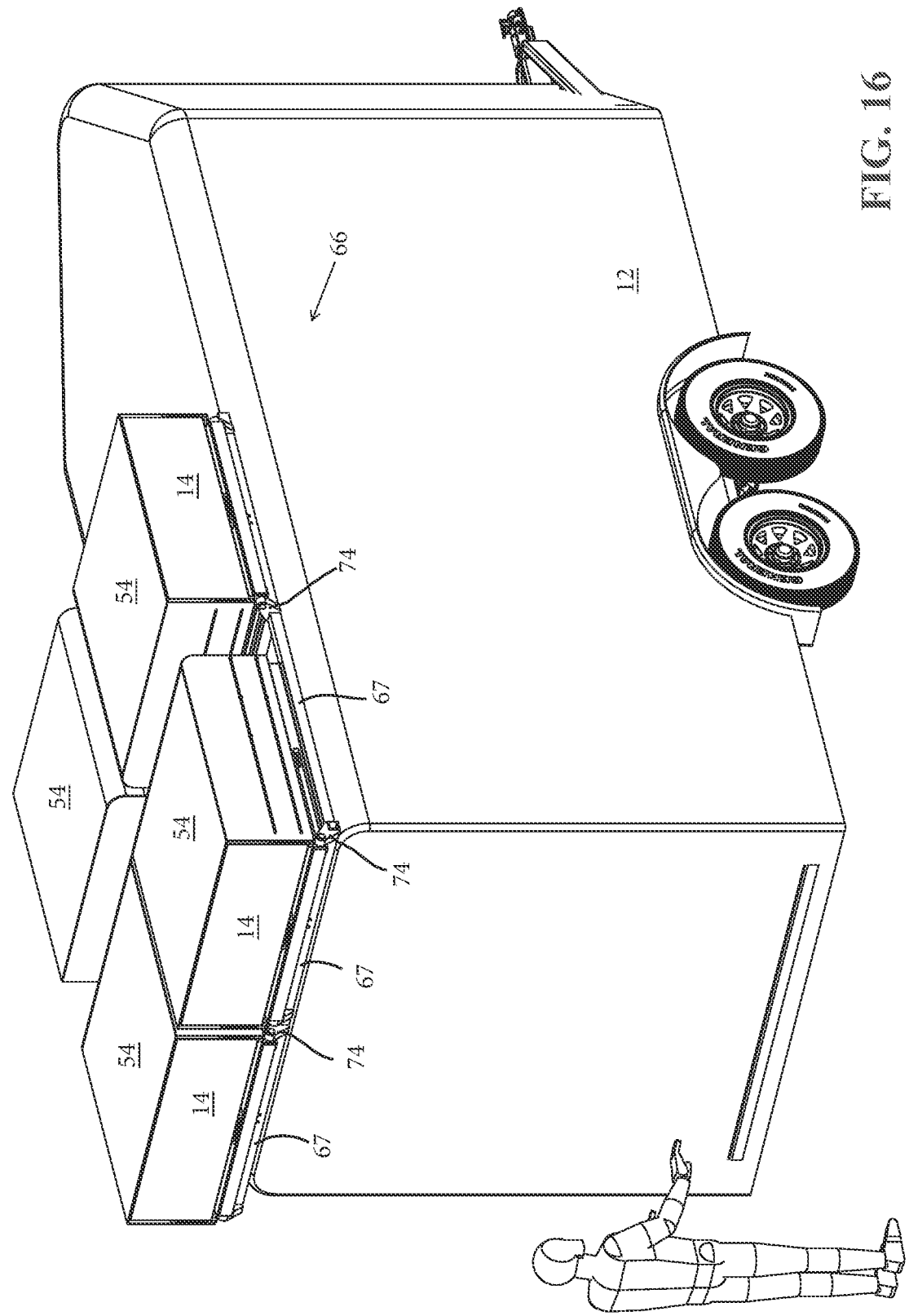
FIG. 16 is a rear-side perspective view of a transport trailer with another deployable hay pod elevator in accordance with the present invention, including four deployable hay pods depicted in a stowed configuration.
Figure 17:
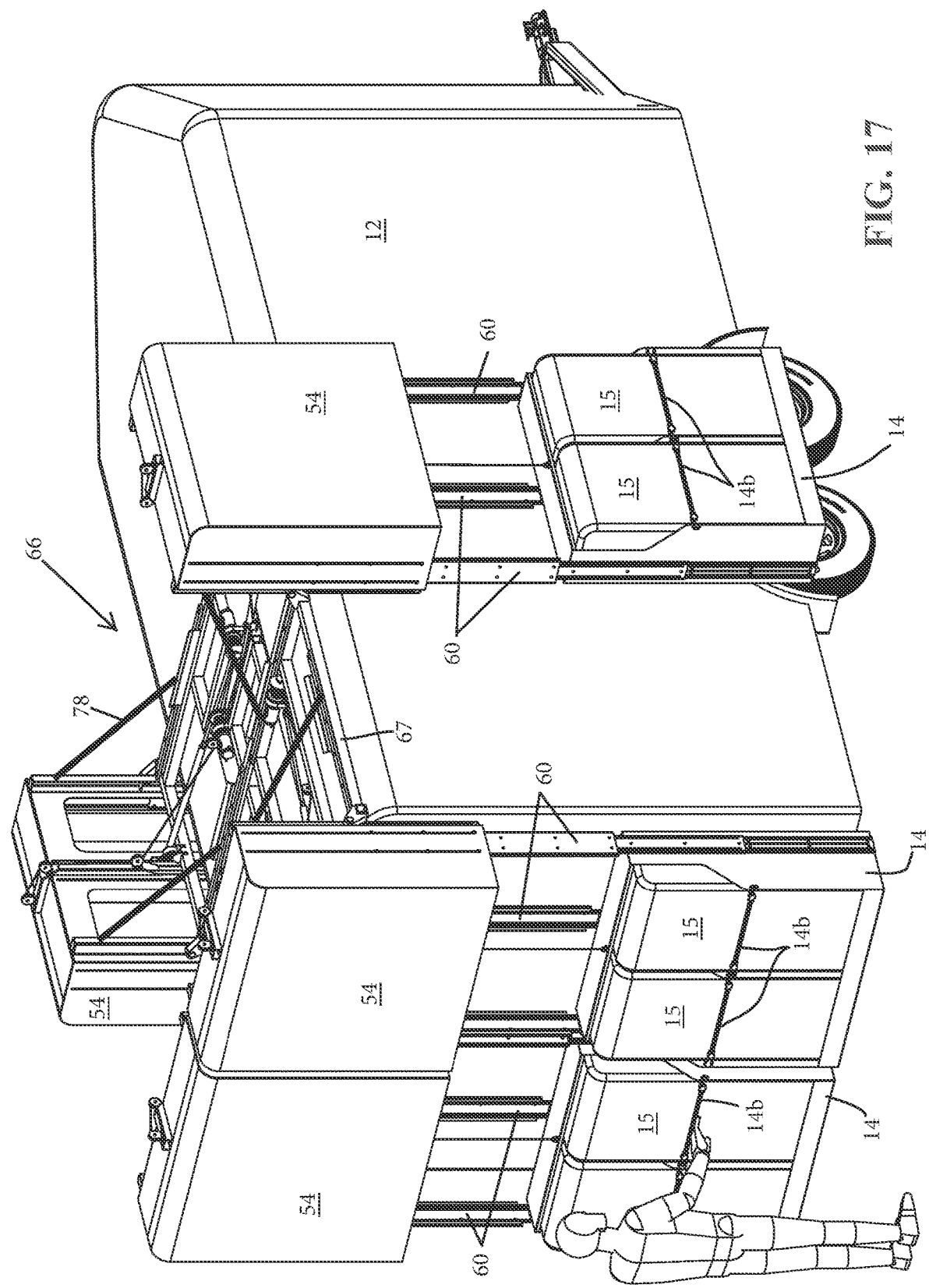
FIG. 17 is another rear-side perspective view of the deployable hay pod elevator of FIG. 16, depicted with the four deployable hay pods in the deployed configuration.
Figure 18:
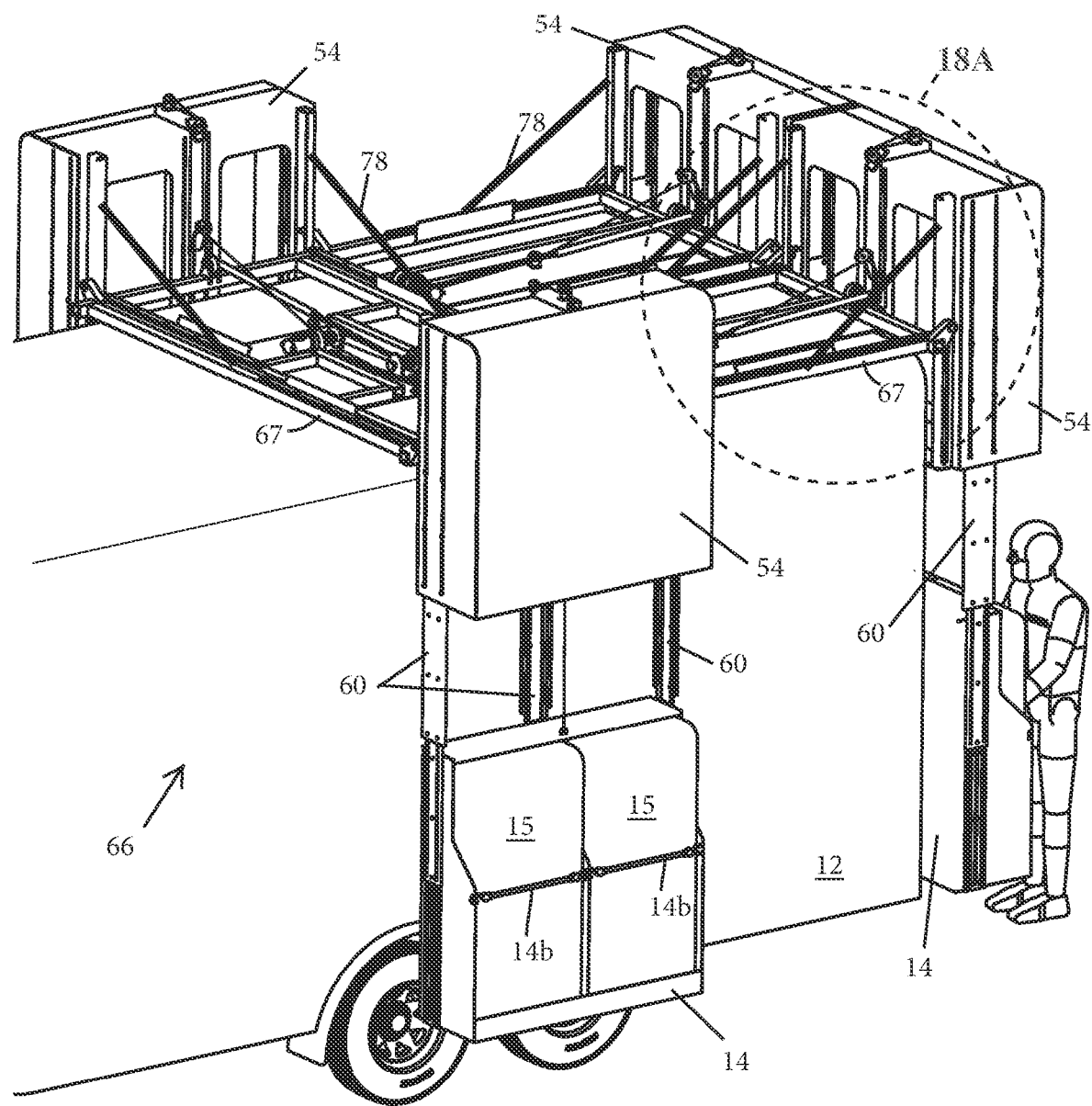
FIG. 18 is a front-side perspective view of the hay pod elevators of FIG. 17.
Figure 19:
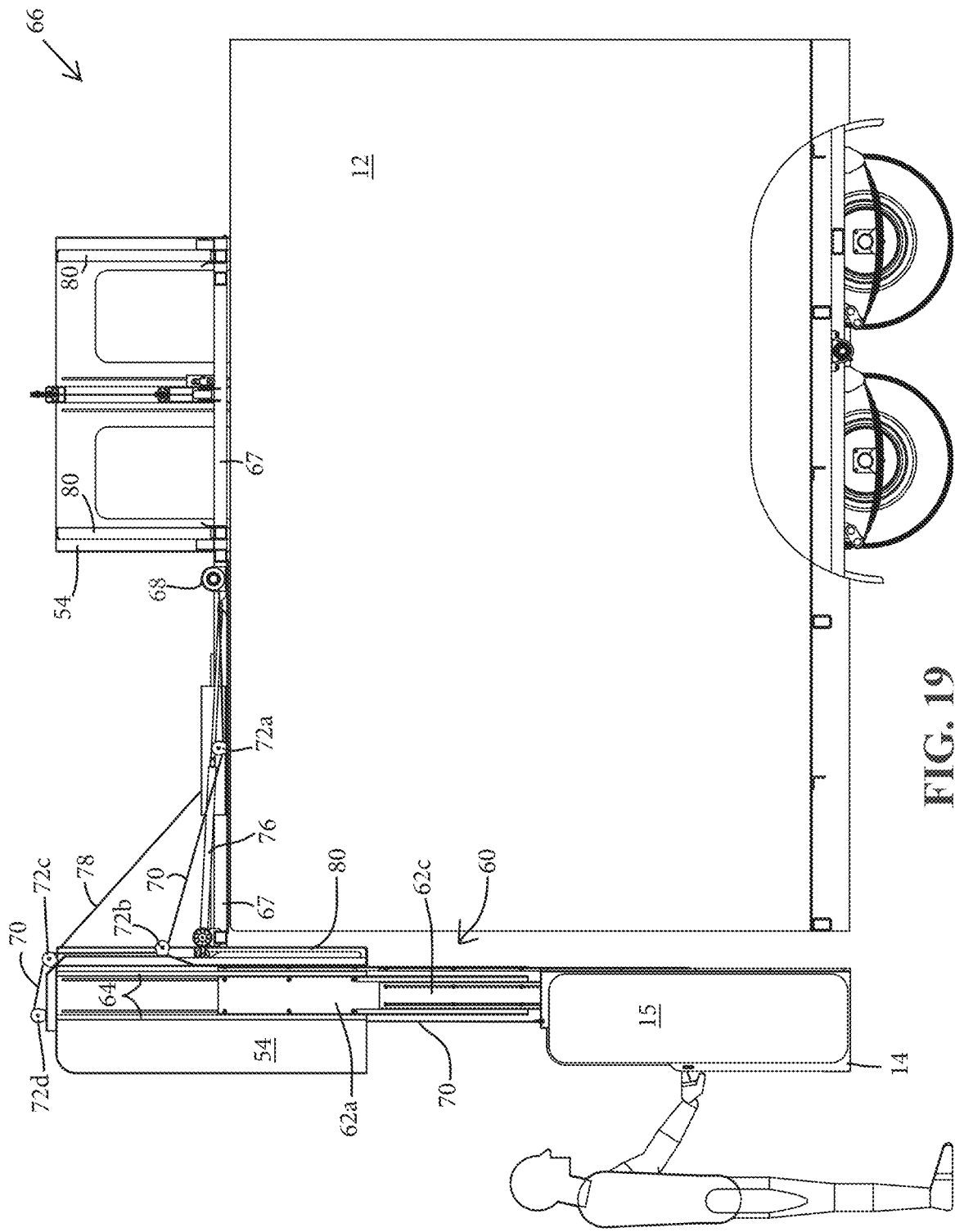
FIG. 19 is a partial-sectional side elevation view of the trailer and hay pod elevators of FIG. 16, depicted in the deployed configuration.
Figure 20:
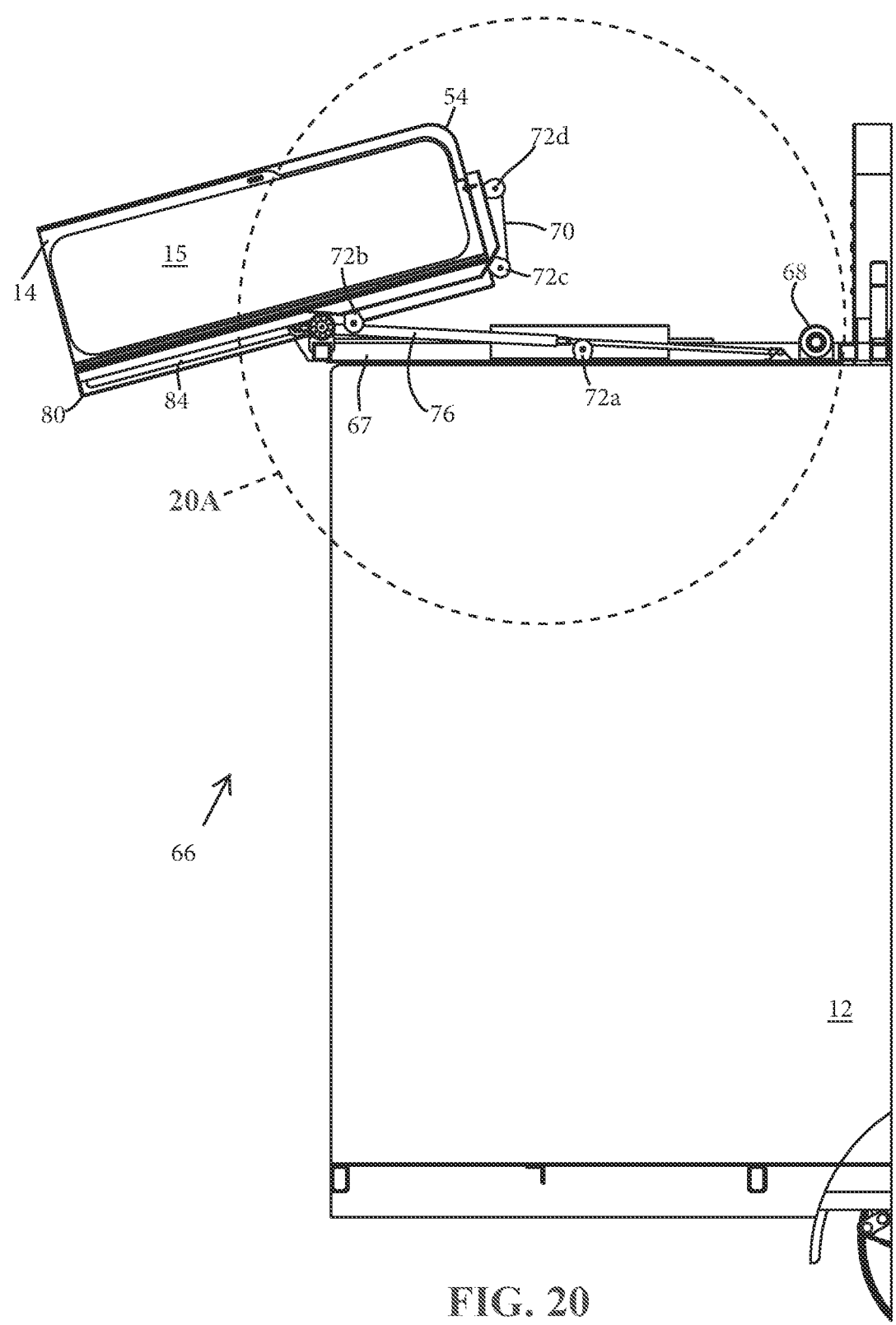
FIG. 20 is another partial-sectional side elevation view of the trailer and hay pod elevator of FIG. 16, depicted in another partially-deployed configuration.
Figure 20A:
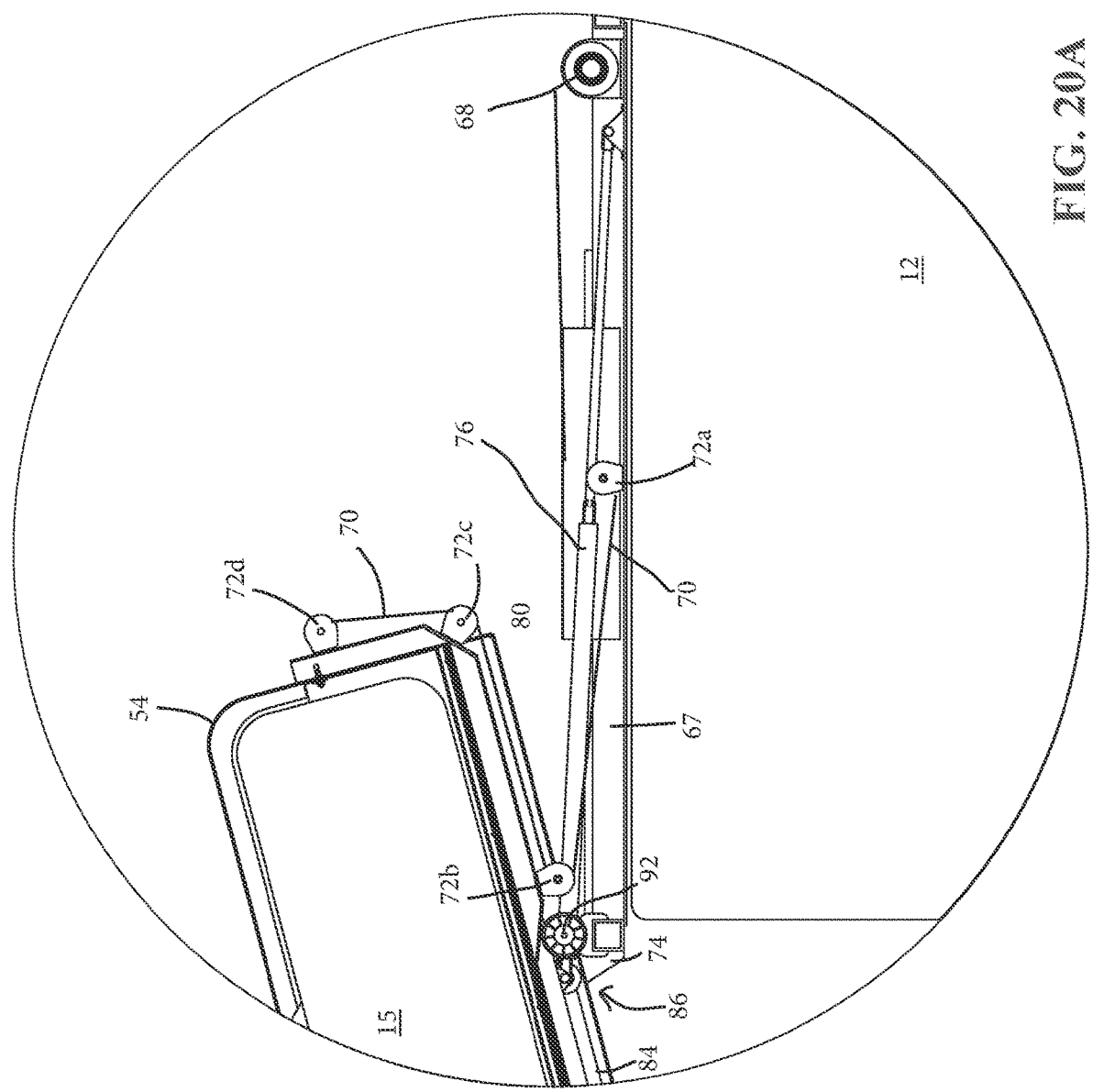
FIG. 20A is an enlarged view of the region designated 20A in FIG. 20.

To raise the hay pod 14 from a deployed configuration, the winch 68 retracts the cable 70, thereby lifting the hay pod 14. As the hay pod 14 reaches the roof of the trailer, it is received by the support box 54. As illustrated in FIGS. 20 and 20A, once the hay pod 14 is fully received in the support box 54 and as the cable 70 continues to retract, the support box 54 begins to pivot over a fulcrum 74 at or near the edge or corner where the trailer roof meets the trailer wall. The support box 54 eventually pivots onto its side and onto the top of the trailer roof and is pulled by the cable 70 into a stowed position, wherein the support box 54 and hay pod 14 are substantially completely over the top of the trailer 12 (FIG. 16). To deploy the hay pod 14, a deployment assistance mechanism 76 is disposed on top of the trailer 12, between the winch 68 and the stowed hay pod 14 and support box 54. The deployment assistance mechanism 76 is provided to move the support box 54 off of the top of the trailer 12 and over the edge of the trailer 12 as cable 70 is payed out from the winch 68 (FIGS. 19-20A). Once the support box 54 reaches its upright deployed configuration, the weight of the hay pod 14 is substantially supported by the cable 70. A lanyard or tether 78 is provided with the hoist 66 for limiting the forward tilt of an upper portion of the support box 54 after it has been pivoted to its deployed configuration (FIGS. 17-19). The lanyard 78 cooperates with the fulcrum 74 and trailer wall to counteract against tipping of the support box 54 relative to the trailer sidewall to retain the support box 54 at the desired upright deployed configuration.

In the illustrated embodiment of FIGS. 17-20A, the deployment assistance mechanism 76 is a gas-assisted shock, but substantially any suitable spring mechanism, hydraulic or pneumatic cylinder, or other linear actuator may be used. Such an alternative deployment assistance mechanism is disclosed in above-referenced U.S. provisional application Ser. No. 62/834,443, and includes a pair of push arms, similar to a scissor-lift arrangement. The assistance mechanism 76 provides a pushing force to support box 54 when the box 54 and hay pod 14 are in the stowed configuration to urge or push the support box 54 toward the edge of the roof of the trailer 12 and then over the trailer's upper edge. The assistance mechanism 76 is compressed and loaded or actuated to store energy when the support box 54 is pulled into the stowed configuration by the winch 68 and cable 70. When the winch 68 pays out the cable 70 to deploy the support box 54 and hay pod 14, the mechanism 76 extends to urge the box 54 toward the edge of the trailer 12. Once the support box 54 reaches the edge of the trailer 12, it begins to pivot over the fulcrum 74 as the winch 68 continues to pay out the cable 70. Eventually, the support box 54 tips over the fulcrum 74 and the support box 54 and hay pod 14 are extended beyond the fulcrum 74 and into a substantially upright configuration. With the support box 54 and hay pod 14 in the upright configuration, the cable 70 supports substantially the entire weight of the hay pod 14 as it lowers the hay pod 14 out of the support box 54 and toward the deployed configuration (or as it raises during stowing). When the hay pods 14 are deployed as shown in FIGS. 17 and 18, their contents (illustrated as hay bales 15) are accessible to a user positioned on the ground surface. Optionally, retainer cords such as bungee straps 14b are provided to selectively secure the hay bales 15 or other goods in each hay pod 14.

Figure 18A:
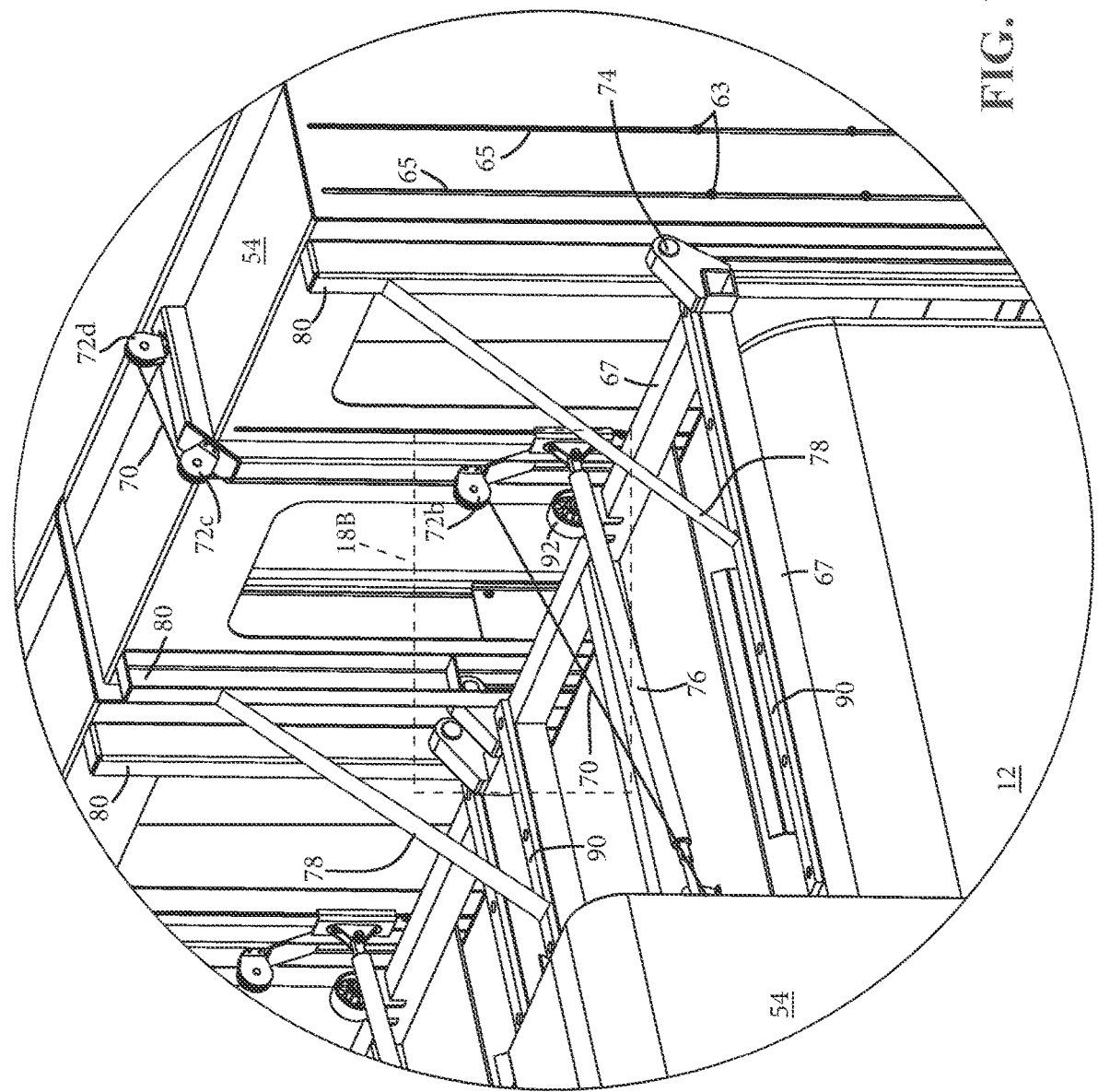
FIG. 18A is an enlarged view of the region designated 18A in FIG. 18.
Figure 18B:
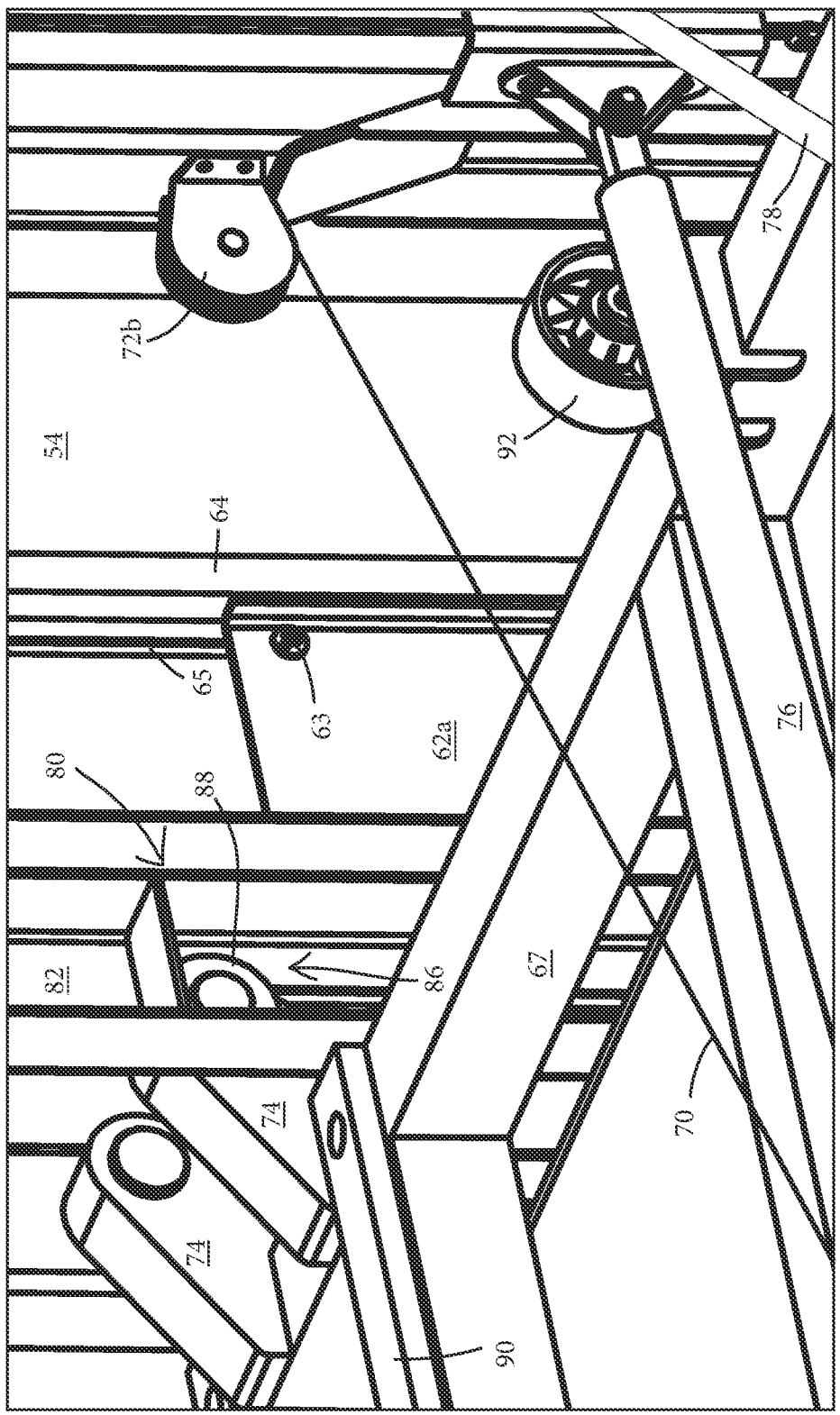
FIG. 18B is an enlarged view of the region designated 18B in FIG. 18A.
Figure 21:
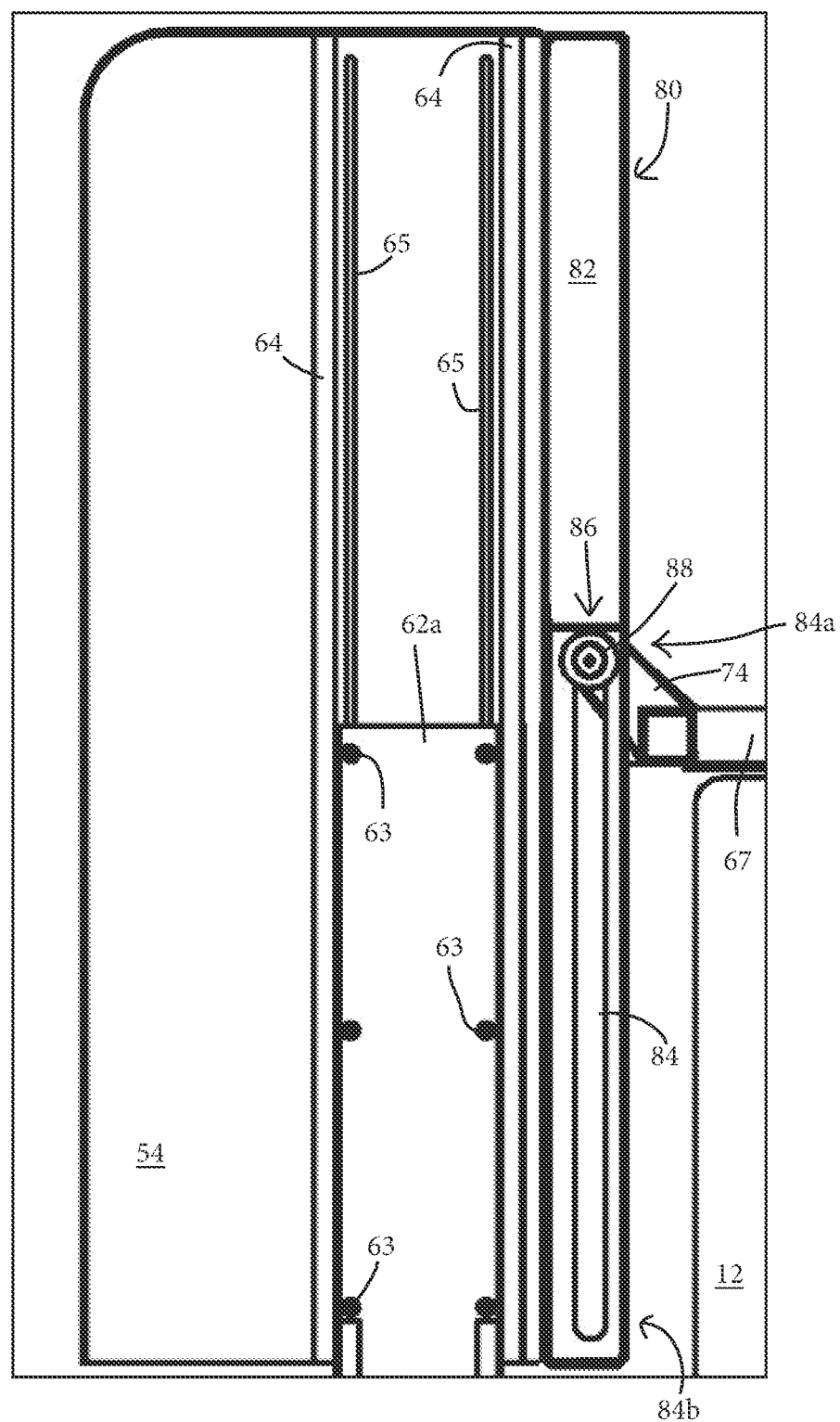
FIG. 21 is an enlarged partial-sectional side elevation view of portions of the deployable hay pod elevator of FIG. 16 in an at least partially-deployed configuration.
Figure 22:
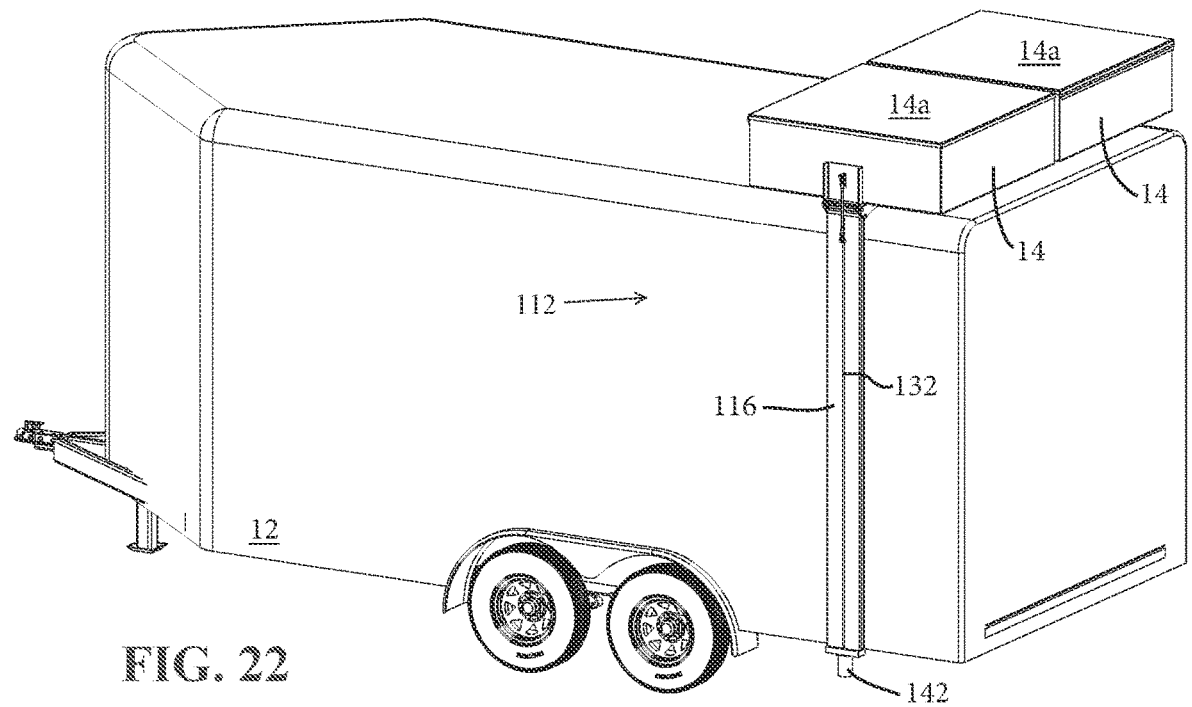
FIG. 22 is a rear-side perspective view of another deployable hay pod elevator in accordance with the present invention, including two deployable hay pods shown in a travel-ready configuration.
Figure 23:
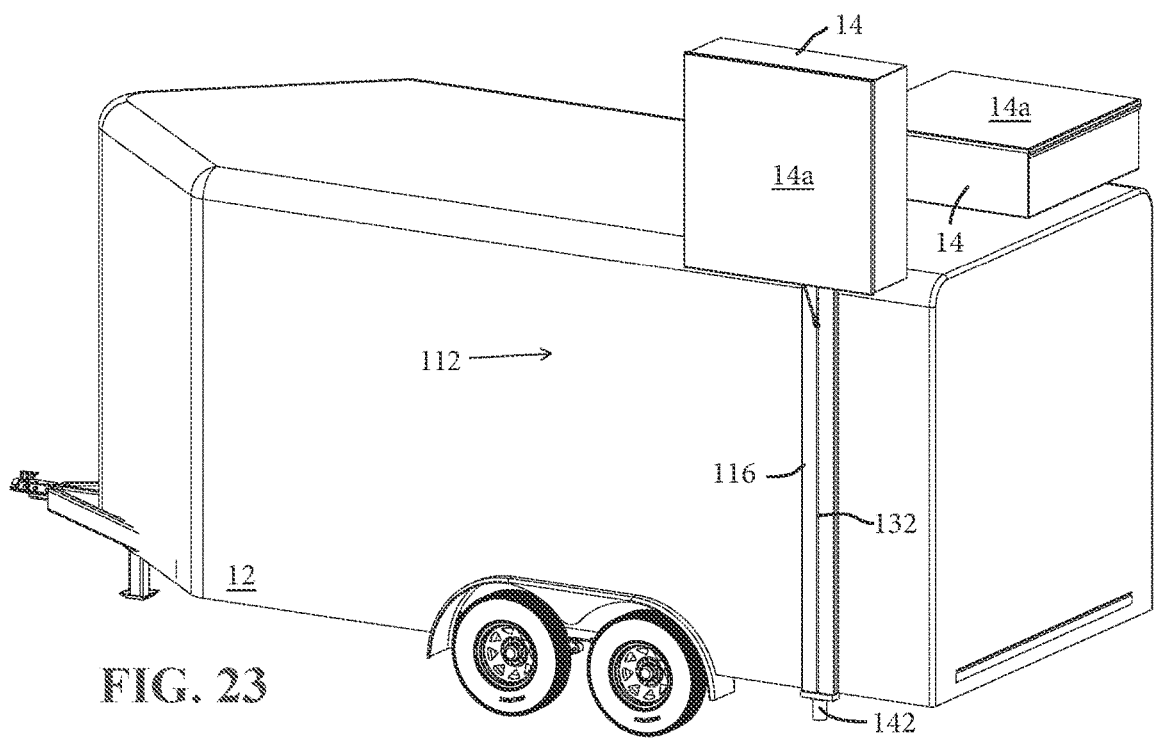
FIG. 23 is another rear-side perspective view of the elevator of FIG. 22 with one of the hay pods depicted in the travel-ready configuration and the other hay pod depicted in a deploying configuration.
Figure 24:
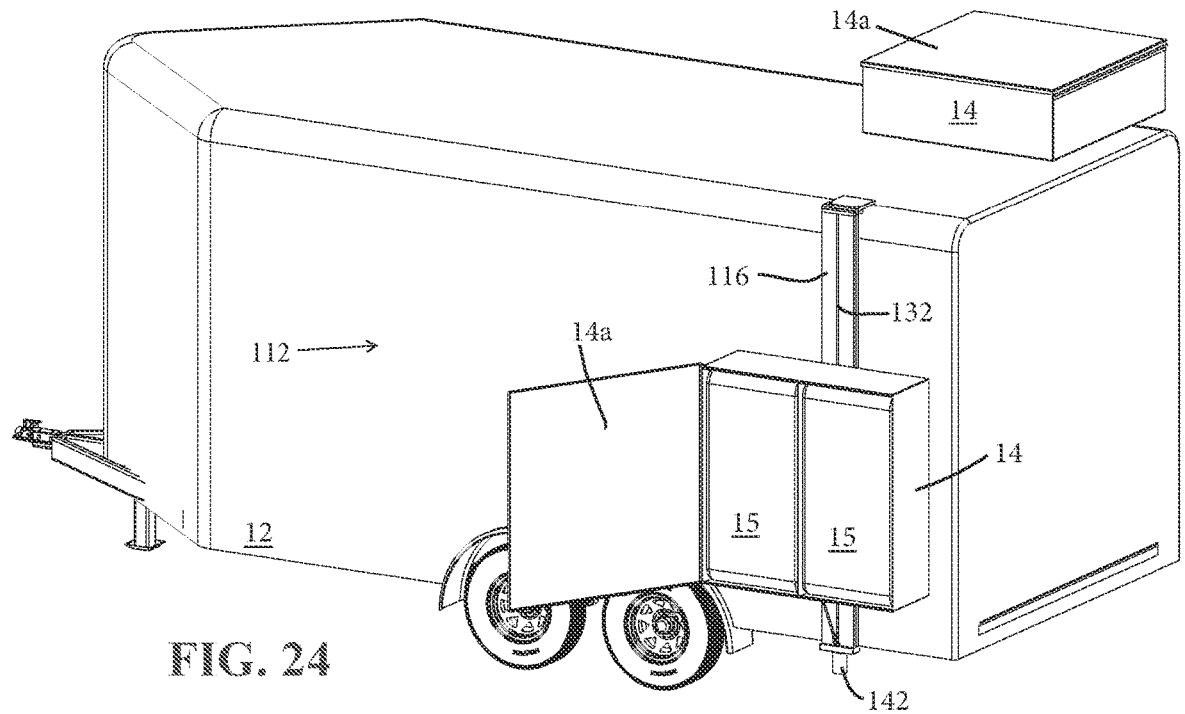
FIG. 24 is another rear-side perspective view of the elevator of FIG. 22 with one of the hay pods depicted in the travel-ready configuration and the other hay pod depicted in a deployed configuration.

As best illustrated in FIGS. 18B and 21, the support box 54 includes a guide channel 80 coupled to the rear (i.e. trailer-facing side) of the box 54. The guide channel 80 extends vertically along roughly the entire length of the rear of the support box 54 when the box 54 is in the upright configuration, as best shown in FIG. 21. The guide channel 80 includes a side 82 that is perpendicular to the rear of the box 54 and extends toward the trailer 12. A slot 84 is formed through a portion of the perpendicular side 82 of the channel 80 and configured to receive a guide 86 that is coupled to the fulcrum 74 (FIGS. 20-21). The guide 86 includes a wheel 88 disposed on an axle so that a portion of the axle between the wheel 88 and the fulcrum 74 passes through the slot 84. The slot 84 and/or portion of the guide channel 80 define a track that moves along the guide 86. The slot 84 includes a top terminal end 84a and a bottom terminal end 84b (FIG. 21). Each terminal end 84a, 84b defines a maximum travel distance of the support box 54 relative to the fulcrum 74. The guide channel 80, slot 84, and guide 86 cooperate to guide the hay pod support box 54 between the stowed configuration to the upright configuration as the hay pod 14 is being stowed or deployed.

During stowage, once the support box has been fully pivoted onto the top of the trailer 12, and as the winch 68 continues to retract the cable 70, the cable 70 pulls the support box 54 toward the winch 68. As the support box 54 slides toward the winch 68, the slot 84 travels along the stationary guide 86 until the box 54 reaches the fully stowed position (FIG. 16). The bottom terminal end 84b of the slot 84 may define the maximum fully stowed position of the box 54 as the terminal end contacts the guide 86. During deployment, as the support box 54 is being pushed off the roof of the trailer 12 by the assistance mechanism 76, the slot 84 travels along the stationary guide 86 until the top terminal end 84a reaches the guide 86. Once terminal end 84a contacts the guide 86 and as the assistance mechanism 76 continues to push the support box 54, the box 54 pivots about the fulcrum 74 until the box 54 reaches its fully upright configuration. At the fully upright configuration, the weight of the support box 54 is substantially supported by the fulcrum 74, such as by the axle of the guide 86.

Optionally, a low-friction rub rail or bumper 90 is disposed on the roof and/or wall of the trailer 12 and/or on the box 67, providing protection for the trailer 12 and/or box 67 and a low-friction sliding surface for the hay pod 14 (FIGS. 18A and 18B). A support roller 92 is provided to support the support box 54 while the support box 54 is in the stowed configuration and to aid in deployment and stowage of the support box 54 (FIGS. 18A-18B and 20A). The support roller 92 is positioned proximate the edge of the trailer roof such that the roller 92 is in contact with the rear of the support box 54 during stowage and deployment. The support roller 92 provides a low friction support that reduces the force required to move the support box 54 along the top of the trailer 12. In the illustrated embodiment of FIGS. 17-20A, the support roller 92 cooperates with the guide 86 and guide channel 80 to facilitate deployment and stowage of the support box 54.

Figure 25A:
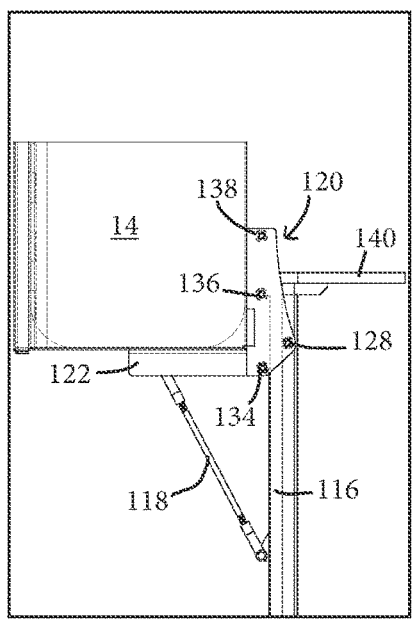
FIGS. 25A-25C are rear elevation views of the elevator of FIG. 22, depicting sequential steps of stowing the deployable hay pod atop the trailer.
Figure 25B:
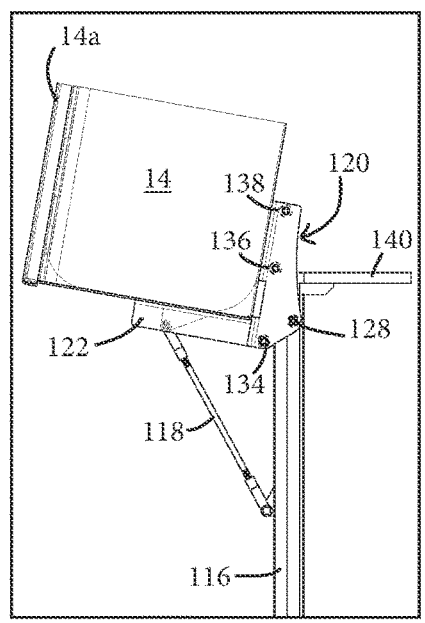
Figure 25C:
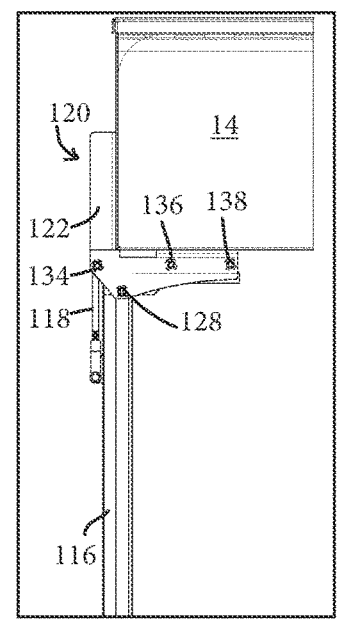
Figure 26:
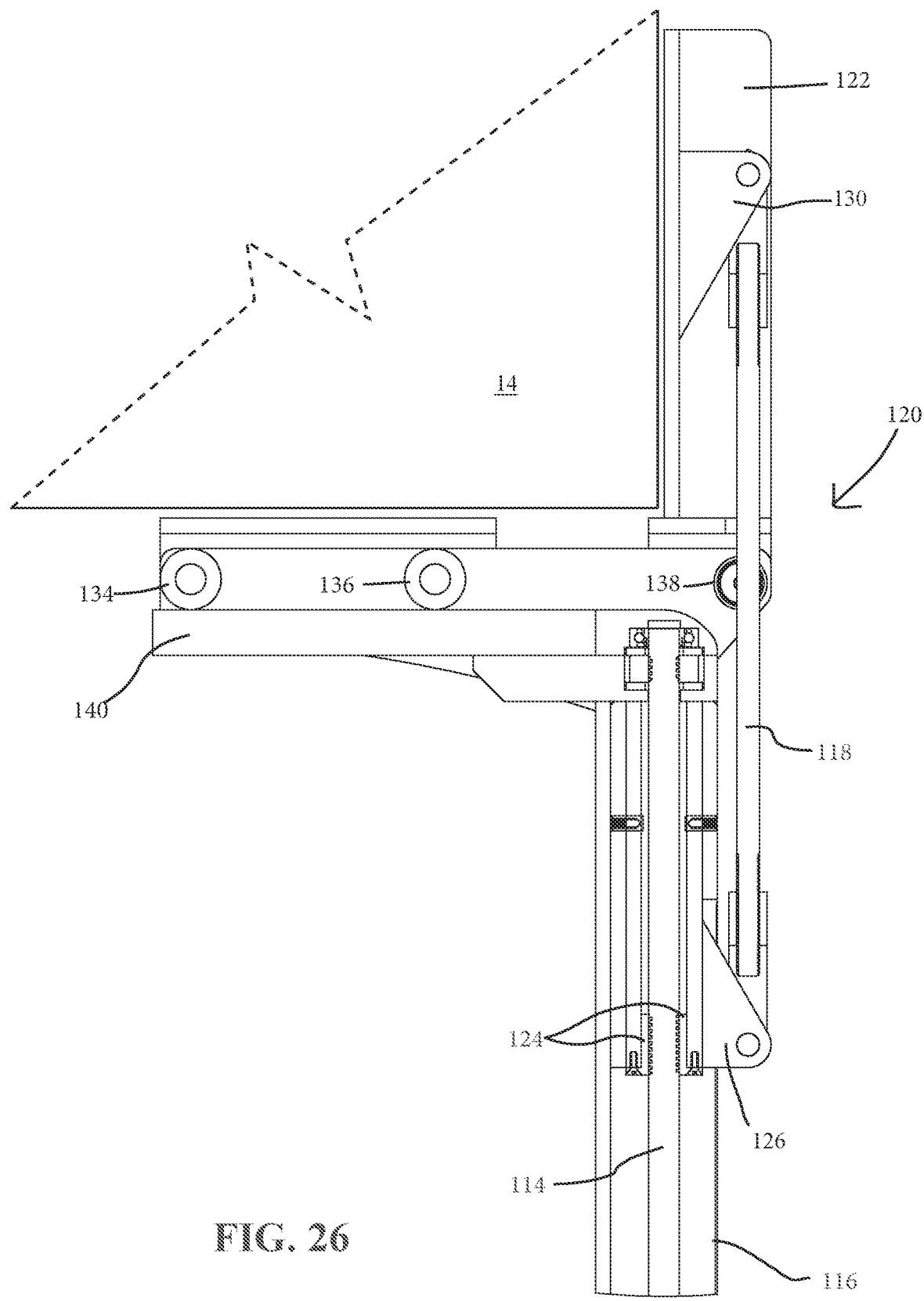
FIG. 26 is an enlarged sectional rear elevation view of an upper portion of the deployable hay pod elevator of FIG. 22.

Referring to FIGS. 22-26, a vertical raising and lowering element such as a lift hoist 112, for raising and lowering a deployable supply handling platform such as a hay pod 14, includes a drive lead screw 114 (FIG. 26), a support tube 116, a hay pod actuation lever 118, and a hay pod actuation mechanism 120. The lead screw 114 is disposed inside the support tube 116 and drives a threaded block 124 up and down the lead screw 114 depending on the rotation direction of the lead screw 114. A motor 142 (FIGS. 22-24) is provided to drive the lead screw 114. The threaded block 124 is pivotably coupled to the actuation lever 118 by a link 126 that passes through a keyway 132 in the support tube 116. The actuation lever 118 is coupled at its other end to the either the actuation mechanism 120 or to a trailer-facing side of the hay pod 14, such as at an upper link 130 (FIG. 26). The lead screw 114, actuation lever 118, actuation mechanism 120, threaded block 124, and link 126 cooperate to stow and deploy the hay pod 14. The link 126 extends between the actuation lever 118 and the threaded block 124 and freely travels within the keyway 132 of the support tube 116 as the threaded block 124 travels along the lead screw 114.

The hay pod actuation mechanism 120 includes a slideable and pivotable actuation frame 122 that movably supports the hay pod 14 (FIGS. 25A-26). The pivotable frame 122 includes a hinge 128 that defines a substantially horizontal pivot axis about which the hay pod 14 and mechanism 120 are pivotable between a substantially upright configuration and a stowed or substantially flat configuration. A lower cam follower 134, an intermediate cam follower 136, and an upper cam follower 138 are disposed in spaced arrangement on the actuation frame 122 (FIGS. 25A-26). The cam followers 134, 136, 138 are configured to follow a cam path defined by the trailer roof line and the exterior surface of the support tube 116. The support tube 116 and its exterior surface define a vertical travel path upon which the hay pod 14 travels relative to the upright wall of the trailer 12. When the hay pod 14 is being raised from the deployed configuration each of the cam followers 134, 136, 138 is in contact with the exterior surface of the support tube 116 (not shown). When the hay pod 14 is in the fully stowed configuration at least the intermediate and upper cam followers 136 and 138 are in contact with the surface of the trailer roof, which may include a wearing surface 140 to protect the roof surface (FIGS. 25A, 25B, and 26).

In sequential order, FIGS. 25A-25C depict the actuation of the hoist 112 as the hay pod 14 approaches and pivots over the roof of the trailer 12 during stowing of the hay pod 14. The actuation of the hoist 112 as the hay pod 14 is being deployed follows the reverse order. During stowage, as the hay pod 14 approaches the roof level of the trailer 12, the actuation lever 118 continues to push the hay pod actuation mechanism 120 upward and the upper cam follower 138 raises above the roof level (FIG. 25A). When the hinge 128 reaches the top of the support tube 116, the hinge 128 is limited from further vertical movement such that as the actuation lever 118 continues to push upward on frame 122, the upward force causes the frame 122 to pivot about the now-stationary hinge 128 (FIG. 25B). Once the frame 122 has begun pivoting about hinge 128, the lower cam follower 134 moves away from the exterior surface of the support tube 116 and the intermediate cam follow 136 tracks around the edge formed between the trailer wall and roof. The threaded block 124 continues to push the actuation lever 118 upward until the upper cam follower 138 contacts the roof surface, at which point the motor 142 stops and the hay pod 14 is in the fully stowed configuration. This sequence is reversed when deploying the hay pod 14 from the stowed configuration, wherein as the lead screw 114 rotation is reversed by the motor 142, it moves the threaded block 124 downward which thereby pulls the actuation lever 118 downward which initiates actuation of the actuation mechanism 120.

Additional means and structures for actuating the hay pod 14 of hoist 112 are disclosed in above-referenced U.S. provisional application Ser. No. 62/834,443, which is incorporated herein by reference. Optionally, an actuation control system is provided to control and reduce the actuation speed of the hay pod actuation mechanism 120. The actuation control system may include a switch disposed at the hoist 112 to de-energize the motor 142 once the hay pod 14 reaches the fully stowed position or the fully deployed position. Preferably, a proximity sensor, motor speed control, limit switch, or circuit controller is in communication with the control system to automatically control the operation of the motor 142 by limiting actuation of the hay pod 14 and actuation mechanism 120 to a safe range of travel and appropriate travel speeds as it moves between the fully stowed and fully deployed positions.

Figure 29:
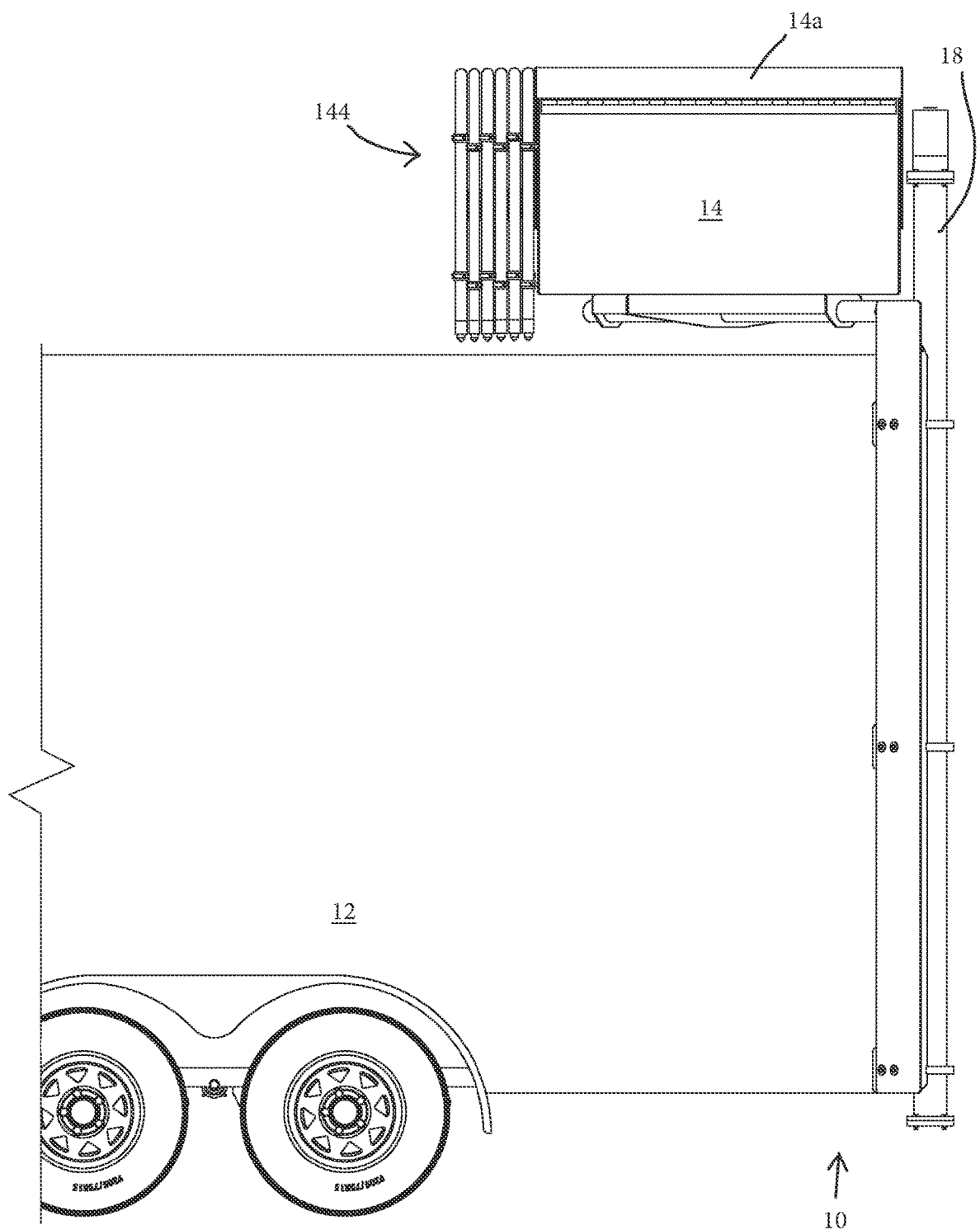
FIG. 29 is a side elevation view of the transport trailer with deployable hay pod elevators and deployable corral depicted with the hay pod elevators and corral in a travel-ready configuration.

In the illustrated embodiment of FIGS. 27-29, a hay pod elevator system 10 is attached at each rear corner of the trailer 12. Respective portions of an integrated deployable corral 144 are pivotably coupled to each of the hay pods 14 of the elevator systems 10. In the illustrated embodiment of FIGS. 27-29, the deployable corral 144 cooperates with the at least one of the walls of the trailer 12 to define a fenced-in corral space 146 when the corral 144 is deployed. However, it will be appreciated that the deployable corral 144 may be configured to define a fenced-in corral space that is defined by only the corral 144. Although each hay pod 14 may have its own set of corral sections that cooperate to form a larger corral, a smaller corral is possible such as if a single set of corral sections are provided at a single hay pod 14. The corral 144 includes a plurality of larger sized panels 148 and a plurality of smaller sized panels 150 that are alternatingly pivotably and extendably coupled to one another in an end-to-end configuration to form a chain 152 of panels, as best illustrated in FIG. 27. The chain of panels 152 is stowable in an accordion-style manner proximate the respective hay pod 14 (FIG. 29). Each chain of panels 152 is deployably coupled to the respective hay pod 14 such that the corral 144 is raised and lowered along with the hay pod 14 as the hay pod 14 is deployed or stowed (FIG. 29). Optionally, the hay pod 14 may be omitted and the supply mount configured to support only a deployable corral 144 or other equipment, tools, machinery, or the like. In such an optional configuration, the elevator system 10 primarily functions to raise and lower the deployable corral 144 or other goods for stowage and deployment relative to the trailer 12.

Referring to FIGS. 30-32, in the stowed configuration of the corral 144, the smaller sized panels 150 are at least partially nestable within the larger panels 148. The nesting manner of the corral 144 reduces the profile thickness of the stowed corral 144. Hinges 154 are provided between upright rails 148a, 150a of adjacent corral panels 148, 150 (FIG. 31A). The dimensions and arrangement of the hinges 154 permit adjacent corral panels 148, 150 to pivot at about 360 degrees relative to one another. Adjacent hinges 154 are offset vertically from one another to improve the nesting functionality of the corral 144 (FIG. 30).

As noted above, the deployable storage systems described herein are not necessarily limited to livestock feed and tack, and with little or no modification, may be implemented for different purposes and in different vehicular or even non-vehicular applications, without departing from the spirit and scope of the present invention. Thus, it will be understood that references to horses or other livestock herein are for purposes of providing examples of applications and features of the disclosed embodiments, and are not intended to limit the invention to livestock transport and supply applications. In addition, while the various embodiments are described with reference to a towable trailer, it will be appreciated that the principles of the present invention may be adapted to cargo vans, trucks, and self-powered recreational vehicles including boats, and even to stationary structures such as sheds and homes where vertical storage or material handling is desired, without departing from the spirit and scope of the present invention.

Thus, the deployable hay pod elevator system of the present invention is installed onto or integrated with a transport trailer such as a livestock trailer, or with substantially any other self-powered vehicle, towable vehicle, and even stationary applications (e.g., inside of barns), if desired. The deployable hay pod elevator system may include a powered deployment mechanism, such as a screw drive or cable system, that enables manual or powered deployment and stowage of the hay pod with little or no lifting required by the operator. Various deployment assistance mechanisms are provided for assisting the powered deployment mechanism to deploy or stow the hay pod, including torsion springs, compression springs, mechanical ramps, hay pod support frames or boxes, and linkage bars. The powered deployment mechanism is operable to perform most of the deployment and stowage steps for the elevator with different levels of automation, actuation, and sensing available as desired. Pivoting the hay pods from the stowed orientation to the deployed orientation relative to the elevator system may be necessary to orient the hay pods to allow access to users or animals.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A deployable supply elevator system for a transport vehicle, said elevator system comprising:
    a powered winch configured for coupling to an upper portion of the vehicle;
    a supply handling platform;
    a flexible cable coupled between said winch and said supply handling platform, wherein said flexible cable is extendable and retractable by said winch to move said supply handling platform along a vertical travel path alongside an upright surface of the vehicle; and
    a deployment assist mechanism configured to urge said supply handling platform upwardly away from the upper portion of the vehicle when said winch extends said cable, such that said supply handling platform is vertically lowerable relative to an upright surface of the vehicle as said winch pays out said cable;
    wherein said supply handling platform is pivotable about a horizontal axis from a first orientation in which said supply handling platform traverses a vertical travel path to a second orientation rotated at least about 90 degrees to the first orientation, when said supply handling platform is raised above an upper region of the upright surface of the vehicle; and
    wherein said powered winch is operable to retract said flexible cable to (i) raise said supply handling platform from a lower region of the upright surface to the upper region of the upright surface, and (ii) pivot said supply handling platform about the horizontal axis and onto the upper portion of the vehicle for stowage of said supply handling platform.

2. The deployable supply elevator system of claim 1, further comprising a guide coupled to said supply handling platform and defining the vertical travel path alongside an upright surface of the vehicle, said vertical travel path extending from the upper region of the upright surface to a lower region of the upright surface.

3. The deployable supply elevator system of claim 2, wherein said guide comprises a plurality of telescoping support bodies that are longitudinally extendable and retractable relative to one another alongside the upright surface of the vehicle.

4. The deployable supply elevator system of claim 3, further comprising a platform receiver configured to be pivotably coupled at the upper portion of the vehicle, said platform receiver configured to receive said supply handling platform as said supply handling platform is being raised during stowage and to then pivot said supply handling platform over the upper portion of the vehicle.

5. The deployable supply elevator system of claim 4, wherein said plurality of telescoping support bodies are mounted in said platform receiver and are selectively extendable downwardly out of said platform receiver as said supply handling platform is lowered by said winch and said cable.

6. The deployable supply elevator system of claim 5, further comprising a plurality of pulleys around which said cable is routed, wherein a first of said pulleys is located at a base of said platform receiver, proximate the upper region of the upright surface of the vehicle, and a second of said pulleys is located at a region of said platform receiver opposite said base, wherein said second pulley is positioned directly above said supply handling platform during raising and lowering of said supply handling platform along the upright surface of the vehicle.

7. The deployable supply elevator system of claim 1, wherein said deployment assist mechanism comprises a platform receiver configured to be pivotably coupled at the upper portion of the vehicle, said platform receiver configured to receive said supply handling platform as said supply handling platform is being raised during stowage and to then pivot said supply handling platform over the upper portion of the vehicle.

8. The deployable supply elevator system of claim 7, wherein said deployment assist mechanism comprises a torsion spring coupled to said platform receiver and configured to store torsional energy while said supply handling platform is being stowed and to release and transfer said torsional energy to said platform receiver during deployment to pivot said platform receiver and said supply handling platform to an upright orientation.

9. The deployable supply elevator system of claim 7, further comprising a tether configured to be coupled between said platform receiver and the upper portion of the vehicle, said tether configured to limit a tilt angle of said platform receiver.

10. The deployable supply elevator system of claim 7, wherein said deployment assist mechanism comprises a linear actuator coupled to said platform receiver and configured to couple to the upper portion of the vehicle.

11. A deployable supply elevator system for a transport vehicle, said elevator system comprising:
    a powered winch configured for coupling to an upper portion of the vehicle;
    a supply handling platform;
    a flexible cable coupled between said winch and said supply handling platform, wherein said flexible cable is extendable and retractable by said winch to move said supply handling platform along a vertical travel path alongside an upright surface of the vehicle;
    a platform receiver configured to be pivotably coupled at the upper portion of the vehicle, said platform receiver configured to receive said supply handling platform as said supply handling platform is being raised during stowage and to then pivot said supply handling platform over the upper portion of the vehicle;
    a plurality of pulleys around which said cable is routed, wherein a first of said pulleys is located at a base of said platform receiver, proximate an upper region of the upright surface of the vehicle, and a second of said pulleys is located at a region of said platform receiver opposite said base, wherein said second pulley is positioned directly above said supply handling platform during raising and lowering of said supply handling platform along the upright surface of the vehicle;
    wherein said supply handling platform is pivotable about a horizontal axis from a first orientation in which said supply handling platform traverses a vertical travel path to a second orientation rotated at least about 90 degrees to the first orientation, when said supply handling platform is raised above the upper region of the upright surface of the vehicle; and
    wherein said powered winch is operable to retract said flexible cable to (i) raise said supply handling platform from a lower region of the upright surface to the upper region of the upright surface, and (ii) pivot said supply handling platform about the horizontal axis and onto the upper portion of the vehicle for stowage of said supply handling platform.

12. The deployable supply elevator system of claim 11, further comprising a guide coupled to said supply handling platform and defining the vertical travel path alongside an upright surface of the vehicle, said vertical travel path extending from the upper region of the upright surface to a lower region of the upright surface.

13. The deployable supply elevator system of claim 12, wherein said guide comprises a plurality of telescoping support bodies that are longitudinally extendable and retractable relative to one another alongside the upright surface of the vehicle.

14. The deployable supply elevator system of claim 13, wherein said plurality of telescoping support bodies are mounted in said platform receiver and are selectively extendable downwardly out of said platform receiver as said supply handling platform is lowered by said winch and said cable.

15. The deployable supply elevator system of claim 11, further comprising a deployment assist mechanism configured to urge said supply handling platform upwardly away from the upper portion of the vehicle when said winch extends said cable, such that said supply handling platform is vertically lowerable relative to an upright surface of the vehicle as said winch pays out said cable.

16. The deployable supply elevator system of claim 15, wherein said deployment assist mechanism comprises a torsion spring coupled to said platform receiver and configured to store torsional energy while said supply handling platform is being stowed and to release and transfer said torsional energy to said platform receiver during deployment to pivot said platform receiver and said supply handling platform to an upright orientation.

17. The deployable supply elevator system of claim 15, wherein said deployment assist mechanism comprises a linear actuator coupled to said platform receiver and configured to couple to the upper portion of the vehicle.

18. The deployable supply elevator system of claim 11, further comprising a tether configured to be coupled between said platform receiver and the upper portion of the vehicle, said tether configured to limit a tilt angle of said platform receiver.

\* \* \* \* \*